(12) United States Patent
Takaishi

(10) Patent No.: US 8,049,987 B2
(45) Date of Patent: *Nov. 1, 2011

(54) POSITION CONTROL APPARATUS AND DISK APPARATUS USING THE SAME

(75) Inventor: Kazuhiko Takaishi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 12/566,138

(22) Filed: Sep. 24, 2009

(65) Prior Publication Data

US 2010/0014185 A1 Jan. 21, 2010

Related U.S. Application Data

(63) Continuation of application No. PCT/JP2007/000468, filed on Apr. 27, 2007.

(51) Int. Cl.
*G11B 5/596* (2006.01)

(52) U.S. Cl. ..................................... 360/77.04

(58) Field of Classification Search ......................... None
See application file for complete search history.

(56) References Cited

U.S. PATENT DOCUMENTS

| | | | |
|---|---|---|---|
| 5,708,581 A | 1/1998 | Martinez | |
| 6,421,200 B2 | 7/2002 | Takaishi | |
| 6,487,035 B1 * | 11/2002 | Liu et al. | 360/77.04 |
| 6,636,376 B1 | 10/2003 | Ho | |
| 6,891,693 B2 * | 5/2005 | Shibata | 360/77.04 |
| 7,265,934 B2 | 9/2007 | Takaishi | |
| 7,372,659 B2 | 5/2008 | Takaishi | |
| 7,433,148 B2 * | 10/2008 | Wong | 360/77.04 |
| 7,643,241 B2 * | 1/2010 | Oh et al. | 360/77.04 |
| 2006/0114602 A1 | 6/2006 | Baek et al. | |
| 2006/0291101 A1 | 12/2006 | Takaishi | |
| 2008/0065240 A1 | 3/2008 | Takaishi | |
| 2010/0014184 A1 * | 1/2010 | Takaishi | 360/75 |
| 2010/0014185 A1 | 1/2010 | Takaishi | |
| 2010/0014186 A1 | 1/2010 | Takaishi | |
| 2010/0268354 A1 | 10/2010 | Takaishi | |

FOREIGN PATENT DOCUMENTS

| | | |
|---|---|---|
| JP | A 7-50075 | 2/1995 |
| JP | B2 2526305 | 6/1996 |
| JP | B2 3460795 | 8/2003 |
| JP | A 2005-25880 | 1/2005 |
| JP | 2006-155875 | 6/2006 |
| JP | B2 3819114 | 6/2006 |
| JP | A 2007-4946 | 1/2007 |

* cited by examiner

*Primary Examiner* — Joseph Feild
*Assistant Examiner* — James L Habermehl
(74) *Attorney, Agent, or Firm* — Greer, Burns & Crain, Ltd.

(57) ABSTRACT

According to one embodiment, a position control apparatus includes: a digital control module that performs position control including disturbance adaptive control with a predetermined sampling period using a control constant, in accordance with a position error between a target position and a current position of the object; and a table that stores the control constant corresponding to a value of $\sin(\omega T)$ or $\cos(\omega T)$, wherein the digital control module is configured to determine a control value of the actuator in accordance with the position error, calculates the value of $\sin(\omega T)$ or $\cos(\omega T)$ according to an adaptive law from a signal based on the position error, reads the corresponding control constant from the table in accordance with the calculated value of $\sin(\omega T)$ or $\cos(\omega T)$, and updates the control constant, to perform the position control including the disturbance adaptive control.

18 Claims, 13 Drawing Sheets

SERVO MARK
GRAY CODE
INDEX
PosA PosB PosC PosD

| sin ωT | L1 | ... | L5 | cos ωT |
|---|---|---|---|---|
| 0 | | | | |
| 1/32 | | | | |
| 2/32 | | | | |
| ... | | | | |
| 1 | | | | |

POSITION CONTROL APPARATUS AND DISK APPARATUS USING THE SAME

CROSS-REFERENCE TO RELATED APPLICATIONS

This application is a continuation of PCT international application Ser. No. PCT/JP2007/000468 filed on Apr. 27, 2007 which designates the United States, incorporated herein by reference.

BACKGROUND

1. Field

The present invention relates to a position control apparatus and a disk apparatus for preventing displacement of an object due to a disturbance, and more particularly, to a position control apparatus and a disk apparatus for preventing displacement due to an unknown disturbance frequency.

2. Description of the Related Art

In recent years, devices for performing position control on objects with high precision are widely used. For example, in a disk apparatus that performs recording and reproduction of data on a rotating storage medium (such as a disk medium) with a head, the head is positioned onto a desired track of the storage medium, and data is read from or written on the track. In such a disk apparatus as a magnetic disk apparatus or an optical disk apparatus, it is very important to accurately position a head onto a target track, so as to achieve higher recording density.

One of the factors that hinder the positioning is the decentering caused when the centers of concentric servo signals on a disk differ from the rotational center of the motor. To correct the decentering, a control method involving an observer has been suggested (see Japanese Patent (KOKAI) No. 3,460,795, for example).

The decentering leads to sinusoidal position fluctuations that are in synchronization with an integral multiple of the rotation frequency of the disk. By the above mentioned observer control method, such sinusoidal position fluctuations can be restrained, and accurate positioning on each target track can be performed. However, to perform such a decentering correction, the frequency to be corrected should be known in advance. For example, the frequency to be corrected should be an integral multiple of the rotation frequency, or should be equal to or twice as high as the rotation frequency.

The second factor that hinders the positioning is the vibrations transmitted from outside the disk apparatus. The vibrations may have various waveforms, but in the following, sinusoidal vibrations are explained. Besides, the above decentering correction control may be applied for the case with frequencies that are not integral multiples of the rotation frequency.

In the above conventional structure, the frequency of a disturbance is of a known value. However, external vibrations transmitted from outside are unknown at the stage of designing the control system, and the frequency cannot be known in advance. Therefore, it is necessary to detect unknown frequencies. As long as the frequencies can be detected, position fluctuations due to external vibrations can be prevented (by adaptively following the external vibrations) according to the control method as disclosed in Japanese Patent (KOKAI) No. 3,460,795.

FIG. 15 illustrates the structure of a conventional control system that detects a disturbance frequency, and suppresses a sinusoidal disturbance at a predetermined frequency, so as to perform position following control. As illustrated in FIG. 15, an arithmetic module 120 calculates the position error e between a target position r and the current position y, and a control module (Cn) 121 calculates a control amount Un. With this control amount Un, a plant 122 (such as a VCM of a disk apparatus) is driven. In a disk apparatus, servo signals from a magnetic head are demodulated, and the current position y of the plant 122 is calculated and is fed back to the arithmetic module 120.

An estimator 124 estimates the angular frequency ω of an external vibration, with the use of the position error e and an internal variable of a disturbance suppression compensator 123 (Cd). A compensation table 125 stores constants of the compensator 123 (Cd) for suppressing external oscillations at each frequency ω. The disturbance suppression compensator 123 (Cd) corrects the internal constant in accordance with a constant that is read from the compensation table 125 in accordance with the angular frequency ω of the estimator 124. In this manner, a disturbance suppression control amount Ud is calculated from the position error e. An addition module 126 adds the control amount Un and the disturbance suppression control amount Ud, and outputs the addition result to the plant 122.

As described above, according to a conventional method, the angular frequency (the disturbance frequency) ω is estimated, and the internal constant of the compensator Cd is corrected in accordance with the value of the angular frequency ω. In this manner, an optimum operation of the compensator Cd is maintained over a wide frequency range (see Japanese Patent Application Publication (KOKAI) No. 2007-004946, for example).

To adapt to unknown disturbance frequencies, the estimated angular frequency ω is corrected whenever necessary in the conventional estimation of the angular frequency ω. Therefore, the adaptive law is obtained through an analog control system in the following manner. The rotation vector of the compensator that compensates periodic disturbances is expressed by the following series of equations (1):

$$z1 = A \cdot \cos(\omega t),$$

$$z2 = A \cdot \sin(\omega t). \qquad 1)$$

In the equations (1), z1 and z2 represent the X-axis component and the Y-axis component of the rotation vector.

The following equations (2) are obtained by temporally differentiating z1 and z2 of the equations (1) with respect to time. Here, ω is function of time.

$$\frac{d}{dt}z1 = -A \cdot \sin(\omega t) \cdot (\omega + \omega' t) = -z2 \cdot (\omega + \omega' t), \qquad (2)$$

$$\frac{d}{dt}z2 = A \cdot \cos(\omega t) \cdot (\omega + \omega' t) = z1 \cdot (\omega + \omega' t),.$$

The angle of the rotation vector is the tangent of the sin component z1 and the cos component z2, and the angular frequency ω is the differential value of the angle. Accordingly, the angular frequency ω of the rotation vector is determined by the following equation (3):

$$\frac{d\theta}{dt} = \frac{d}{dt}(\omega t) = \omega + \omega' t = \frac{d}{dt}\tan^{-1}\left(\frac{z2}{z1}\right) = \frac{z1\frac{dz2}{dt} - \frac{dz1}{dt}z2}{z1^2 + z2^2}. \qquad (3)$$

Here, the compensator uses the following equation (4). In the equation (4), ω is assumed to be a constant.

$$s\begin{pmatrix} z1 \\ z2 \end{pmatrix} = \begin{pmatrix} 0 & -\omega \\ \omega & 0 \end{pmatrix}\begin{pmatrix} z1 \\ z2 \end{pmatrix} + \begin{pmatrix} L4 \\ L5 \end{pmatrix}e. \qquad (4)$$

In the equation (4), z1 represents the sine component of the disturbance, z2 represents the cosine component of the disturbance, L4 and L5 represent input gains, e represents the position error, and s represents the Laplacian.

The state equation of the analog compensator of the equation (4) is expanded, and the differentials of z1 and z2 are determined. The following equation (5) is obtained by substituting the differentials of z1 and z2 into the equation (3).

$$\omega + \omega' t = \frac{z1(\omega \cdot z1 + L5 \cdot e) - (-\omega \cdot z2 + L4 \cdot e)z2}{z1^2 + z2^2} \qquad (5)$$
$$= \omega + \frac{L5 \cdot z1 - L4 \cdot z2}{z1^2 + z2^2} e.$$

If the estimated angular frequency of an unknown disturbance is correct, the compensator 123 (Cd) can properly suppress the disturbance. As a result, the position error e or the estimated position error of the observer becomes zero. In other words, when the angular frequency w to be processed by the compensator 23 (Cd) is the same as the estimated angular frequency ω of a disturbance, ω' of the equation (5) or the term of the position error e of the right side should be zero. Accordingly, the equation (5) is expressed by a time differential form of the angular frequency, to obtain the adaptive law (an integral compensation law) expressed by the following equation (6):

$$\frac{d}{dt}\omega = K \cdot \frac{L5 \cdot z1 - L4 \cdot z2}{z1^2 + z2^2} e. \qquad (6)$$

The value of ω is corrected whenever necessary, with the use of this equation. The equation (6) is transformed into an integral form expressed by a digital control equation, and the following equation (7) is obtained:

$$\omega[k+1] = \omega[k] + K \cdot \frac{L5 \cdot z1[k] - L4 \cdot z2[k]}{z1[k]^2 + z2[k]^2} e. \qquad (7)$$

Here, K represents the adaptive gain. The equation (7) uses the adaptive law in an addition formula. This can be expressed by a multiplication formula. With the use of this adaptive law, a linear relationship can be obtained between a disturbance oscillation frequency and the estimated frequency ω, as illustrated in FIG. 16.

In recent years, the aforementioned control system is applied to a digital control system so as to execute the above control system in data processing of a processor. In the above conventional technique, an analog adaptive law is obtained based on analog formulas, and the analog adaptive law is converted into a digital adaptive law. As a result, when the equation (7) is used in a digital control operation, a disturbance cannot be properly suppressed (or position following cannot be performed with respect to the disturbance) through digital disturbance adaptive control. This is because the estimated angular frequency ω is based on analog formulas, though it is directly determined.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, A position control apparatus configured to perform position control on an object with the use of an actuator in accordance with a position of the object, includes: a digital control module configured to perform position control including disturbance adaptive control with a predetermined sampling period using a control constant, in accordance with a position error between a target position and a current position of the object; and a table configured to store the control constant corresponding to a value of sin(ωT) or cos(ωT), with ω representing an angular frequency of a disturbance, T representing the sampling period. The digital control module is configured to determine a control value of the actuator in accordance with the position error, calculates the value of sin(ωT) or cos(ωT) according to an adaptive law from a signal based on the position error, reads the corresponding control constant from the table in accordance with the calculated value of sin(ωT) or cos(ωT), and updates the control constant, to perform the position control including the disturbance adaptive control.

According to another embodiment of the invention, a disk apparatus includes: a head configured to read information from a disk; an actuator configured to move the head in a transverse direction of tracks of the disk; a digital control module configured to perform position control including disturbance adaptive control with a predetermined sampling period using a control constant, in accordance with a position error between a target position and a current position of the object; and a table configured to store the control constant corresponding to a value of sin(ωT) or cos(ωT), with ω representing an angular frequency of a disturbance, T representing the sampling period. The digital control module is configured to determine a control value of the actuator in accordance with the position error, calculates the value of sin(ωT) or cos(ωT) according to an adaptive law from a signal based on the position error, reads the corresponding control constant from the table in accordance with the calculated value of sin(ωT) or cos(ωT), and updates the control constant, to perform the position control including the disturbance adaptive control.

The following is a description of a disk apparatus, a first embodiment of a position control system, a second embodiment of a control position system, a third embodiment of a position control system, a fourth embodiment of a position control system, a fifth embodiment of a position control system, and other embodiments, with reference to the accompanying drawings.

Figure 1:
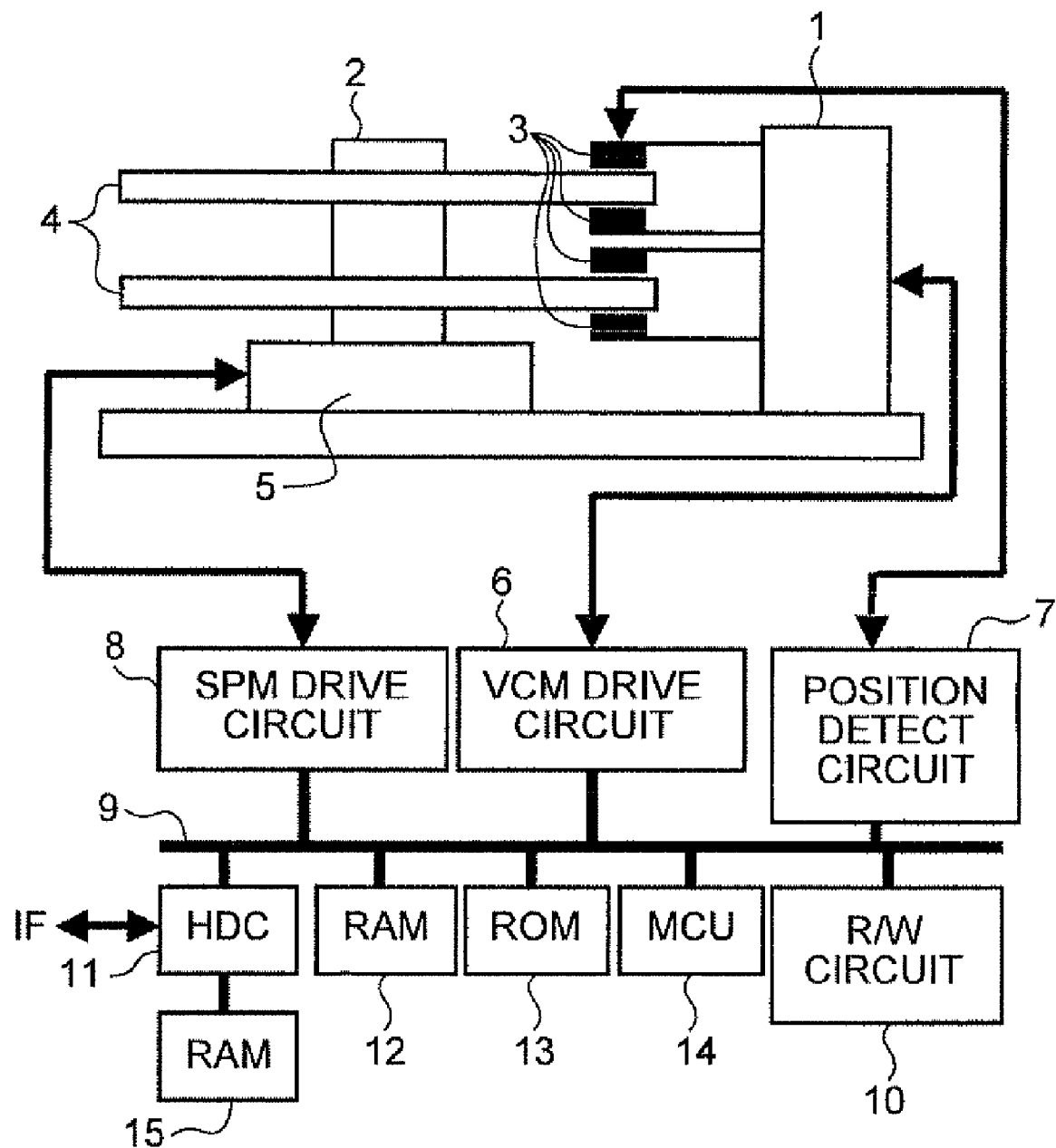
FIG. 1 is an exemplary diagram of a disk storage device according to a first embodiment of the invention.
Figure 2:
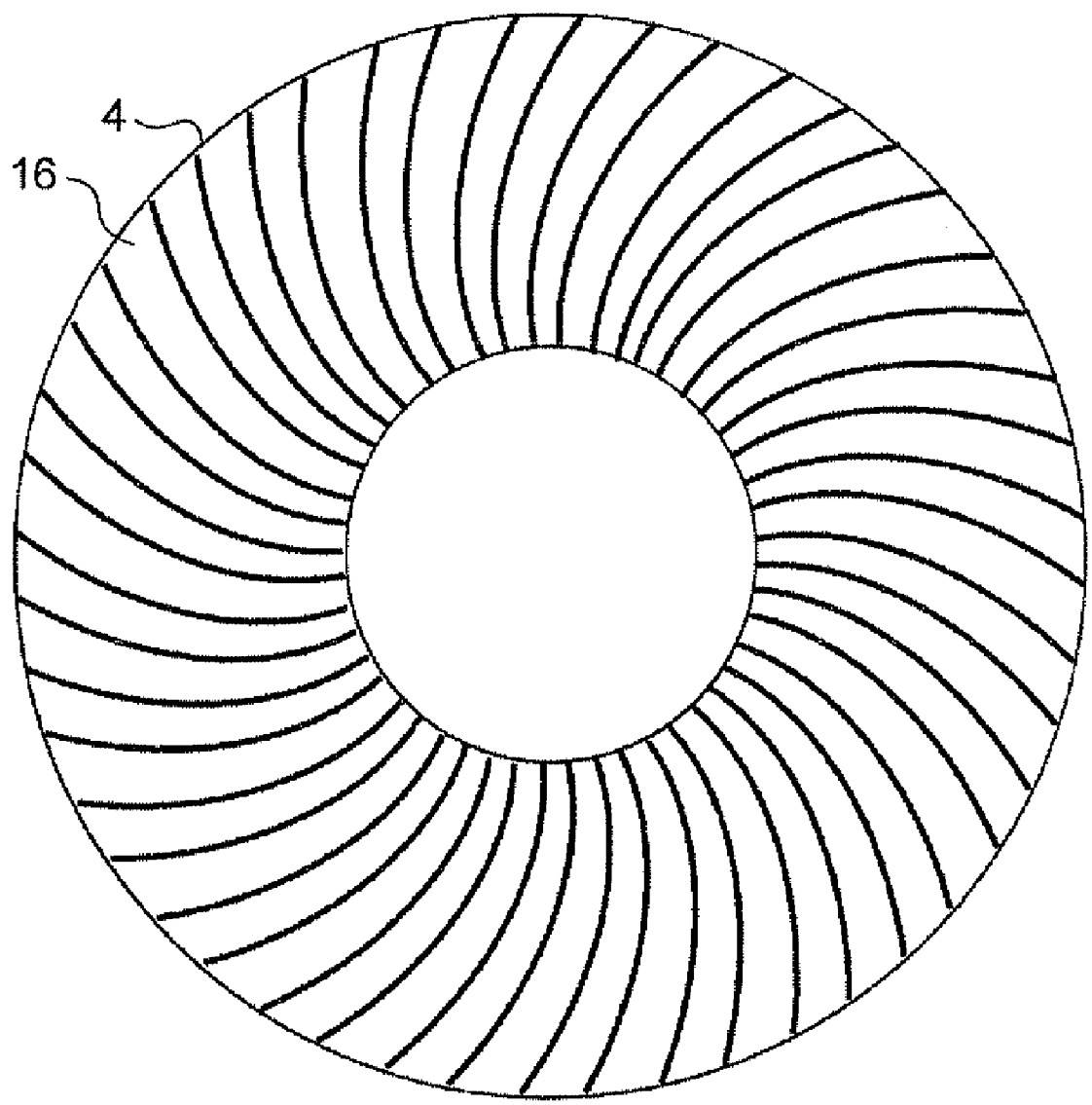
FIG. 2 is an exemplary explanatory diagram of a positional signal on a disk having the structure of FIG. 1 in the first embodiment.
Figure 3:
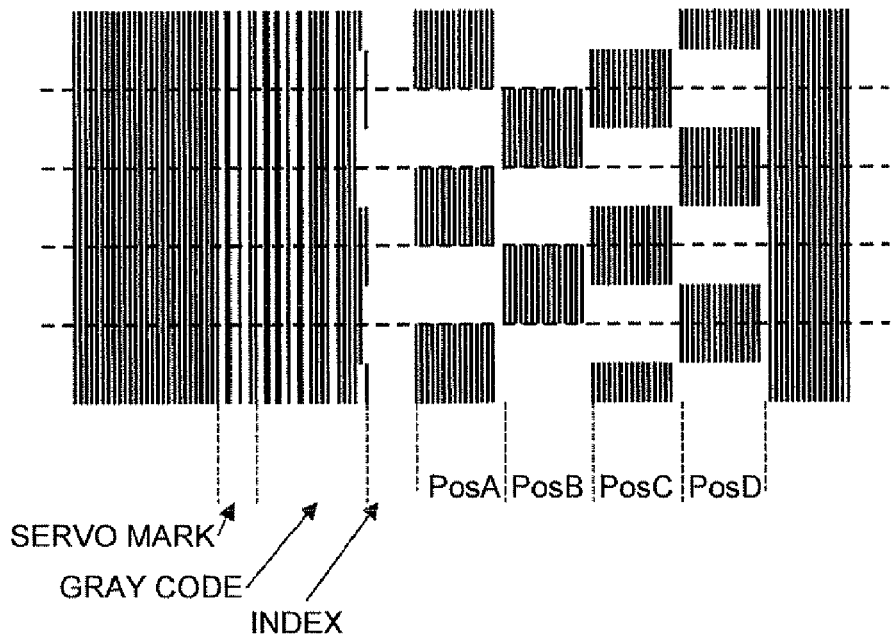
FIG. 3 is an exemplary explanatory diagram of the positional signal of FIG. 2 in greater detail in the first embodiment.
Figure 4:
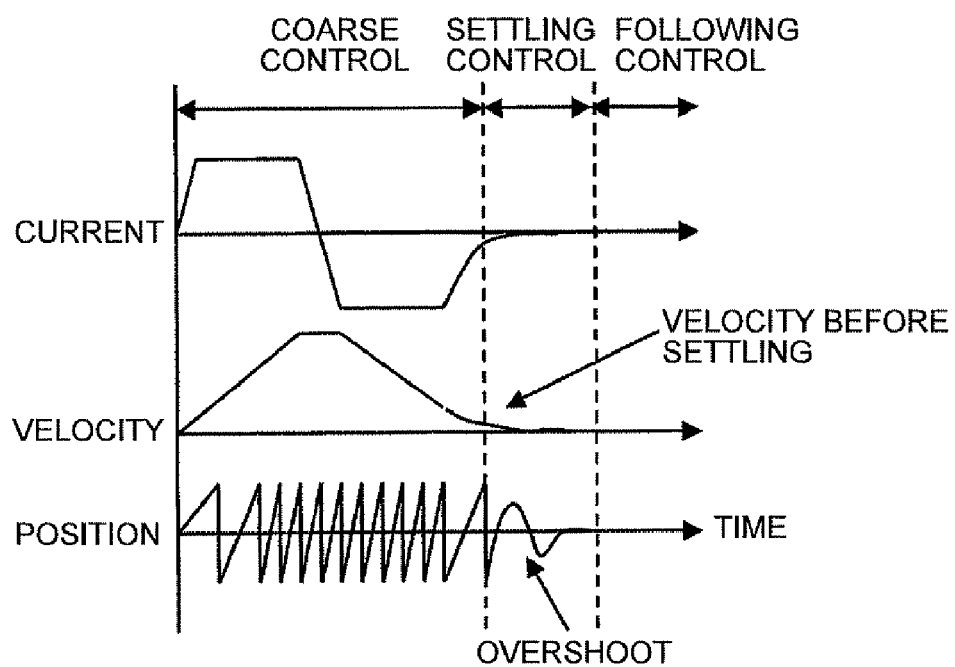
FIG. 4 is an exemplary explanatory diagram of a seek operation of a head illustrated in FIG. 1 in the first embodiment.

FIG. 1 is a configuration diagram of a disk apparatus according to the embodiments. FIG. 2 is a layout of position signals on a magnetic disk. FIG. 3 is a configuration diagram of position signals on the magnetic disk of FIGS. 1 and 2. FIG. 4 is an explanatory diagram of the head position control of FIG. 1.

FIG. 1 illustrates a magnetic disk apparatus as the disk apparatus. As illustrated in FIG. 1, a magnetic disks 4 that are magnetic storage medium are provided around a rotating shaft 2 of a spindle motor 5. The spindle motor 5 rotates the magnetic disks 4. An actuator (VCM) 1 has magnetic heads 3 at the top ends of its arms, and moves the magnetic heads 3 in the radial direction of the magnetic disks 4.

The actuator 1 is formed with a voice coil motor (VCM) that revolves around a rotating shaft. In the drawing, the two magnetic disks 4 are mounted on the magnetic disk apparatus, and the four magnetic heads 3 are simultaneously driven by the same actuator 1.

Each of the magnetic heads 3 includes a read element and a write element. Each of the magnetic heads 3 is formed by stacking the read element including magnetoresistive (MR) elements on a slider and the write element including write coils on the read element.

A position detect circuit 7 converts positional signals (analog signals) read by the magnetic heads 3 into digital signals. A read/write (R/W) circuit 10 controls reading and writing of the magnetic heads 3. A spindle motor (SPM) drive circuit 8 drives the spindle motor 5. A voice coil motor (VCM) drive circuit 6 supplies a driving current to the voice coil motor (VCM) 1, to drive the VCM 1.

A microcontroller (NCU) 14 detects (demodulates) the current position from the digital positional signal supplied from the position detect circuit 7, and calculates a VCM drive command value in accordance with the position error of the detected current position and a target position. In other words, the MCU 14 performs position demodulation and servo control. A read only memory (ROM) 13 stores the control program for the MCU 14 and the like. A random access memory (RAM) 12 stores data to be used for the processing by the MCU 14 and the like.

A hard disk controller (HDC) 11 determines a position in a cycle, based on the sector number of servo signals, and records or reproduces data. A random access memory (RAM) 15 for buffering temporarily stores read data and write data. The HDC 11 communicates with a host via an interface (IF) such as a USB, ATA, or SCSI. A bus 9 connects those components.

As illustrated in FIG. 2, servo signals (positional signals) 16 are circumferentially arranged at equal intervals on each of the tracks from the outer circumference to the inner circumference of each magnetic disk 4. Each of the tracks is formed with sectors, and the solid lines in FIG. 2 represent the recorded positions of the servo signals 16. As illustrated in FIG. 3, each of the positional signals is formed with a servo mark "SERVO MARK", a track number "GRAY CODE", an index signal "INDEX", and offset information (servo bursts) PosA, PosB, PosC, and PosD. The dotted lines in FIG. 3 represent track centers.

With the use of the track number "GRAY CODE" and the offset information PosA, PosB, PosC, and PosD, the position of the magnetic head in the radial direction is detected. Based on the index signal "INDEX", the position of the magnetic head in the circumferential direction is grasped.

For example, the sector number at which an index signal is detected is set at "0", and the sector number is incremented every time a servo signal is detected. In this manner, the sector number of each sector of each track is obtained. The sector numbers of servo signals are used as the references when data recording or reproduction is performed. An index signal is provided for each one rotation. Instead of the index signals, the sector number may be used.

FIG. 4 illustrates an example of seek control to be performed by the MCU 14 of FIG. 1 on the actuator. The MCU 14 checks the position of the actuator through the position detect circuit 7 of FIG. 1. The MCU 14 performs a servo calculation, and supplies an appropriate current to the VCM 1. FIG. 4 depicts the control transition from the seek starting point at which a head 3 is moved from a track position to a target track position. FIG. 4 also depicts the current of the actuator 1, the velocity of the actuator (the head), and the position of the actuator (the head).

The seek control transits to coarse control, to settling control, and to following control, so that the head can be moved to the target position. The coarse control is basically velocity control, and the settling control and the following control are basically position control. In either case, it is necessary to detect the current position of the head.

To check the position, the servo signals are recorded on the magnetic disk in advance, as illustrated in FIG. 2. More specifically, the serve marks representing the starting positions of the servo signals, the gray codes representing the track numbers, the index signals, and signals PosA through PosD representing offsetting are recorded as illustrated in FIG. 3. Those signals are read by the magnetic heads, and the position detect circuit 7 converts the servo signals into digital values.

Figure 5:
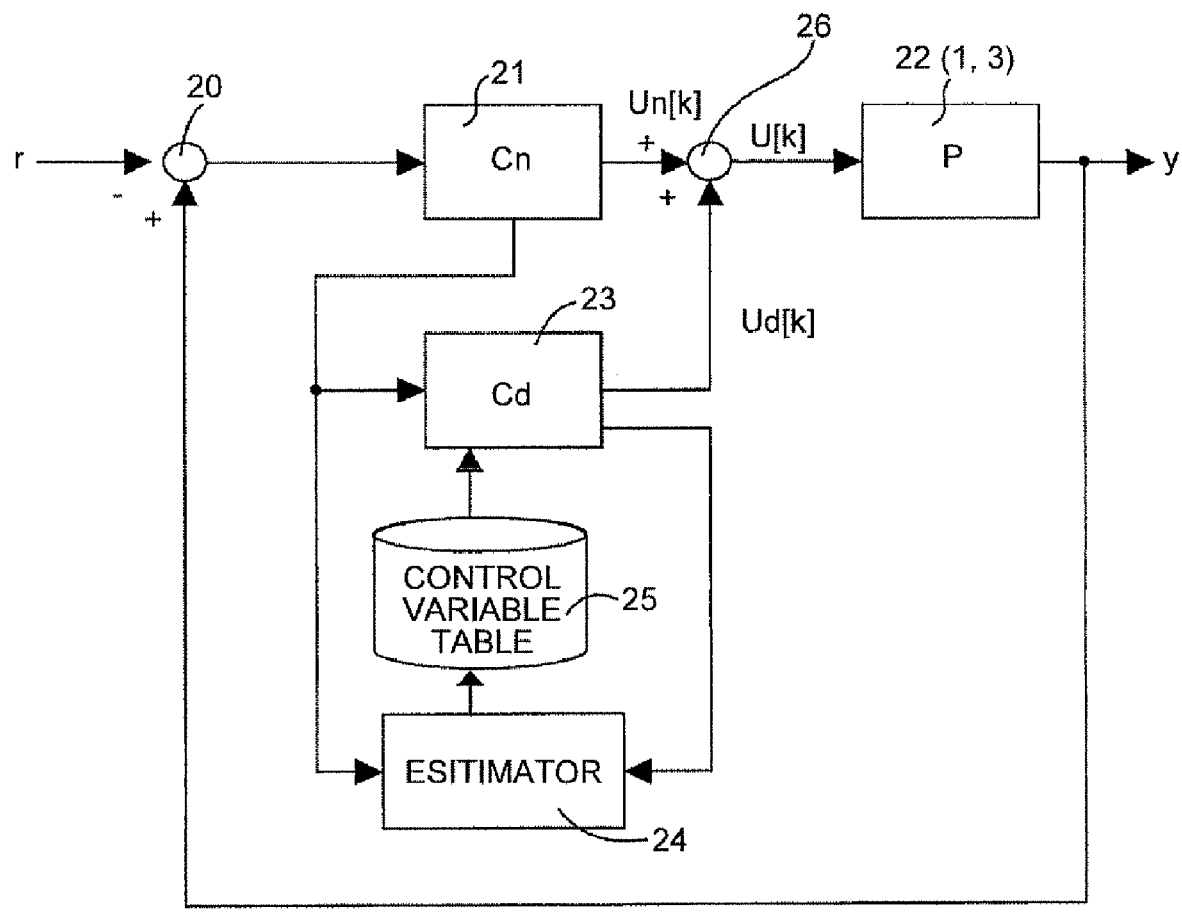
FIG. 5 is an exemplary block diagram of a position control system having a disturbance suppression compensator in the first embodiment.
Figure 6:
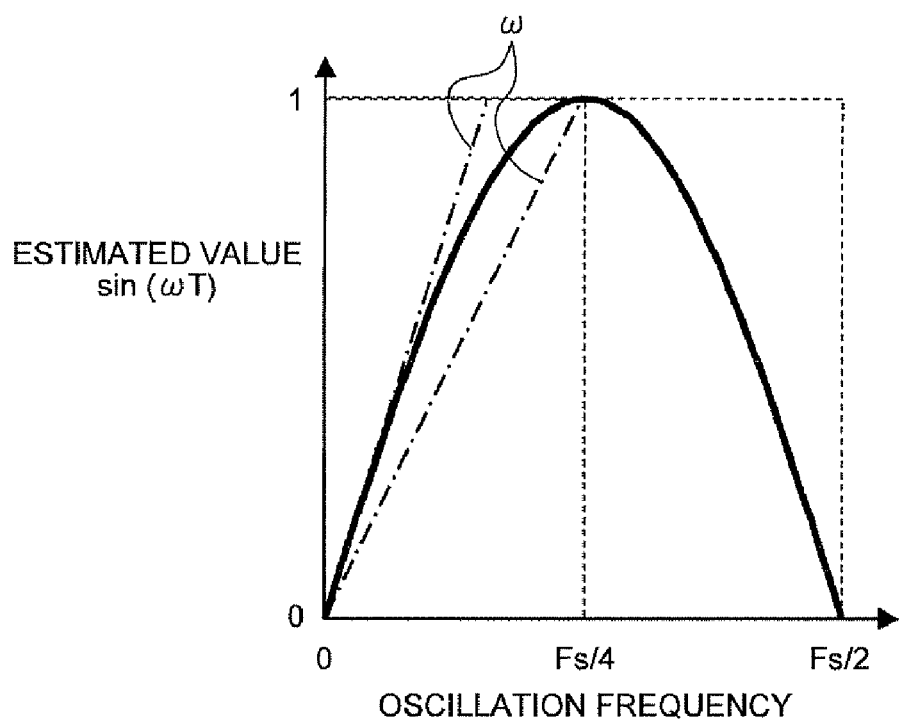
FIG. 6 illustrates a relationship between sin ωT and the oscillation frequency of FIG. 5.
Figure 7:
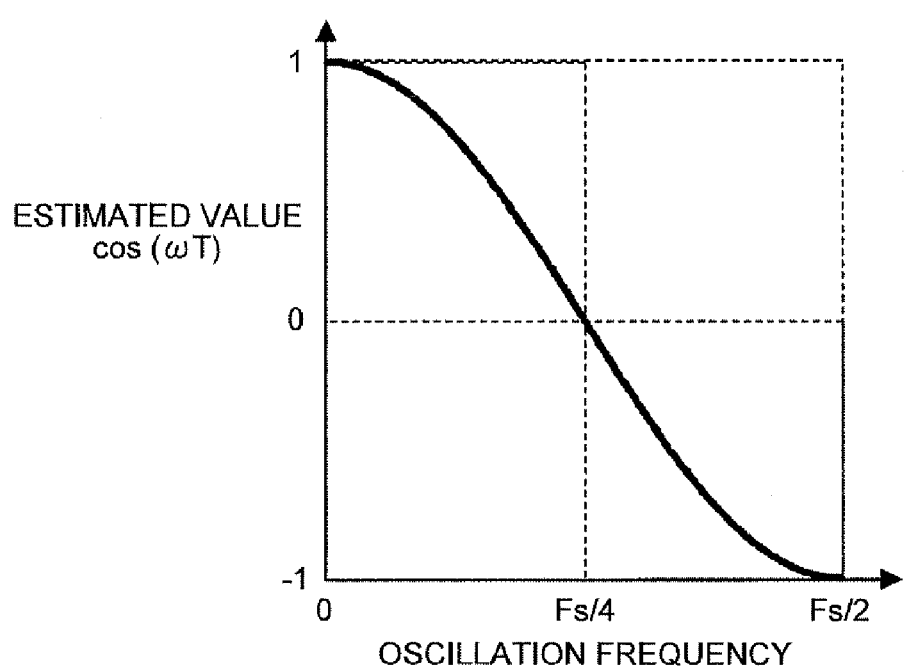
FIG. 7 illustrates a relationship between cos ωT and the oscillation frequency of FIG. 5.

FIG. 5 is a block diagram of a first embodiment of a position control system (a servo control system). FIG. 6 illustrates the relationship between the oscillation frequency and the estimate value $\sin(\omega T)$ of FIG. 5. FIG. 7 illustrates the relationship between the oscillation frequency and the estimated value $\cos(\omega T)$ of FIG. 5.

FIG. 5 is an arithmetic block diagram of the servo control system to be realized by the MCU 14. More specifically, an arithmetic module 20 calculates the position error e between a target position r and a current position y, and inputs the position error e to a control module (Cn) 21. Based on the position error e, the control module (Cn) 21 performs a control operation to calculate a control amount Un and drive the VCM 1 and 3 that are a plant (P) 22. The position of the plant demodulates the servo signals from the magnetic heads 3, calculates the current position y, and feeds the current position y back to the arithmetic module 20.

An estimator 24 estimates $\sin(\omega T)$ with the angular frequency $\omega$ of external oscillation, using the position error e and the internal variable of a disturbance suppression compensator (Cd) 23. A control variable table 25 stores the constants of the compensator (Cd) 23 for suppressing the external oscillation, in association with $\sin(\omega T)$ with the angular frequency $\omega$.

The disturbance suppression compensator (Cd) 23 corrects the internal constant according to the constant read from the compensation table 25, based on the $\sin(\omega T)$ with the angular frequency $\omega$ of the estimator 24. The disturbance suppression compensator (Cd) 23 calculates a disturbance suppression control amount Ud from the position error e. An addition module 26 adds the control amount Un to the disturbance suppression control amount Ud, and outputs the addition result to the plant 22. The disturbance suppression control amount is the amount to be used for controlling disturbance in such a manner that the positional relationship between the disk and the head is not changed. Since the head is normally displaced by disturbance, adaptive control is performed on the driving value of the VCM that drives the head.

In the embodiments, the estimator 24 estimates $\sin(\omega T)$. The reason is described in the following. In the following description, the control module 21, the compensator 23, and the estimator 24 constitute a control system formed with an observer. First, the adaptive law of a predictive observer is described.

The compensator 23 in the predictive observer is expressed by the following equation (8). In the equation (8), z1 represents the sine component of the disturbance, z2 represents the cosine component of the disturbance, L4 and L5 represent input gains, and e represents the position error.

$$\begin{pmatrix} z1[k+1] \\ z2[k+1] \end{pmatrix} = \begin{pmatrix} a11 & a12 \\ a21 & a22 \end{pmatrix} \begin{pmatrix} z1[k] \\ z2[k] \end{pmatrix} + \begin{pmatrix} L4 \\ L5 \end{pmatrix} e[k] \qquad (8)$$

If the disturbance model corresponds to a sinusoidal wave, the matrix A of the equation (8) is expressed by the following equation (9).

$$\begin{pmatrix} a11 & a12 \\ a21 & a22 \end{pmatrix} = \begin{pmatrix} \cos(\omega T) & -\sin(\omega T) \\ \sin(\omega T) & \cos(\omega T) \end{pmatrix} \qquad (9)$$

When the equation (8) is expanded, the equation (10) is obtained.

$$\begin{pmatrix} Z_1[k+1] \\ Z_2[k+1] \end{pmatrix} = \begin{pmatrix} a_{11} \cdot Z1[k] + a_{12} \cdot Z_2[k] + L_4 \cdot e[k] \\ a_{21} \cdot Z1[k] + a_{22} \cdot Z_2[k] + L_5 \cdot e[k] \end{pmatrix} \qquad (10)$$

Since the time differential of the equation (2) in analog is a subtraction in digital, the equation (11) is obtained by subtracting Z2[k] from Z2[k+1] of the equation (10), and multiplying the resultant by Z1[k].

$$z1[k](z2[k+1]-z2[k])=z1[k](a21 \cdot z1[k]+(a22-1)z2[k]+L5 \cdot e[k]) \qquad (11)$$

Likewise, the equation (12) is obtained by subtracting Z1[k] from Z1[k+1] of the equation (10), and multiplying the resultant by Z2[k].

$$z2[k](z1[k+1]-z1[k])=z2[k](a12 \cdot z2[k]+(a11-1)z1[k]+L4 \cdot e[k]) \qquad (12)$$

Since the analog differentiation is a digital subtraction as in the equation (3), the equation (13) is obtained by determining a difference between the equation (11) and the equation (12).

$$\begin{aligned} z1[k](z2[k+1] - z2[k]) - z2[k](z1[k+1] - z1[k]) = \\ z1[k](a21 \cdot z1[k] + (a22-1)z2[k] + L5 \cdot e[k]) - \\ z2[k](a12 \cdot z2[k] + (a11-1)z1[k] + L4 \cdot e[k]) = \\ a21 \cdot z1[k]^2 + (a22 - a11)z1[k] \cdot z2[k] - \\ a12 \cdot z2[k]^2 + (L5 \cdot z1[k] - L4 \cdot z2[k])e[k] \end{aligned} \qquad (13)$$

When the disturbance model corresponds to a sinusoidal wave, the following relationships are satisfied as in the equation (9): a11=a22 (=$\cos(\omega T)$) and a12=–a22 (=$\sin(\omega T)$). Accordingly, the equation (13) can be transformed into the following equation (14).

$$\begin{aligned} z1[k](z2[k+1]-z2[k])-z2[k](z1[k+1]-z1[k])=\sin(\omega T) \\ (z1[k]^2+z2[k]^2)+(L5 \cdot z1[k]-L4 \cdot z2[k])e[k] \end{aligned} \qquad (14)$$

The equation (15) is obtained by dividing the equation (14) by the sum of the square of z1 and the square of z2.

$$\frac{z1[k](z2[k+1] - z2[k]) - z2[k](z1[k+1] - z1[k])}{z1[k]^2 + z2[k]^2} = \sin(\omega T) + \frac{\begin{pmatrix} L5 \cdot z1[k] - \\ L4 \cdot z2[k] \end{pmatrix} e[k]}{z1[k]^2 + z2[k]^2} \qquad (15)$$

Compared with the equation (5), $\sin(\omega T)$ is estimated as a disturbance in the equation (15), while $\omega$ is estimated as a disturbance in the equation (5). More specifically, in a digital control operation, it is necessary to estimate $\sin(\omega T)$, and, according to the adaptive law, $\sin(\omega T)$ is estimated so that the second term of the right side of the equation (15) becomes "0".

Next, an adaptive law of a current observer is described. A current observer is more widely used than the predictive observer in digital control.

The compensator 23 in the current observer is expressed by the following equations (16). In the equations (16), z1 represents the sine component of the disturbance, z2 represents the cosine component of the disturbance, L4 and L5 represent input gains, and e represents the position error.

$$\begin{pmatrix} zh1[k] \\ zh2[k] \end{pmatrix} = \begin{pmatrix} z1[k] \\ z2[k] \end{pmatrix} + \begin{pmatrix} L4 \\ L5 \end{pmatrix} e[k] \\ \begin{pmatrix} z1[k+1] \\ z2[k+1] \end{pmatrix} = \begin{pmatrix} a11 & a12 \\ a21 & a22 \end{pmatrix} \begin{pmatrix} zh1[k] \\ zh2[k] \end{pmatrix} \quad (16)$$

The equation (17) is obtained by combining the two equations (16).

$$\begin{pmatrix} z1[k+1] \\ z2[k+1] \end{pmatrix} = \begin{pmatrix} a11 & a12 \\ a21 & a22 \end{pmatrix} \begin{pmatrix} z1[k] \\ z2[k] \end{pmatrix} + \begin{pmatrix} a11 & a12 \\ a21 & a22 \end{pmatrix} \begin{pmatrix} L4 \\ L5 \end{pmatrix} e[k] \quad (17)$$

If the disturbance model corresponds to the sinusoidal wave, the matrix A of the equation (17) is expressed by the following equation (18). To simplify the equations, $\cos(\omega T)$ and $\sin(\omega T)$ will be hereinafter represented by "c" and "s".

$$\begin{pmatrix} a11 & a12 \\ a21 & a22 \end{pmatrix} = \begin{pmatrix} \cos(\omega T) & -\sin(\omega T) \\ \sin(\omega T) & \cos(\omega T) \end{pmatrix} = \begin{pmatrix} c & -s \\ s & c \end{pmatrix} \quad (18)$$

The inverse matrix of the matrix A of the equation (18) is expressed by the following equation (19):

$$\begin{pmatrix} a11 & a12 \\ a21 & a22 \end{pmatrix}^{-1} = \begin{pmatrix} \cos(\omega T) & \sin(\omega T) \\ -\sin(\omega T) & \cos(\omega T) \end{pmatrix} = \begin{pmatrix} c & s \\ -s & c \end{pmatrix} \quad (19)$$

The equation (20) is obtained by dividing the equation (17) by the matrix A of the equation (18), and substituting the inverse matrix of the matrix A of the equation (19) into the resultant.

$$\begin{pmatrix} c & s \\ -s & c \end{pmatrix} \begin{pmatrix} z1[k+1] \\ z2[k+1] \end{pmatrix} = \begin{pmatrix} z1[k] \\ z2[k] \end{pmatrix} + \begin{pmatrix} L4 \\ L5 \end{pmatrix} e[k] \quad (20)$$

The equation (21) is obtained by determining z1 and z2 of the k sample from the equation (20).

$$\begin{pmatrix} z1[k] \\ z2[k] \end{pmatrix} = \begin{pmatrix} c & s \\ -s & c \end{pmatrix} \begin{pmatrix} z1[k+1] \\ z2[k+1] \end{pmatrix} - \begin{pmatrix} L4 \\ L5 \end{pmatrix} e[k] \\ = \begin{pmatrix} c \cdot z1[k+1] + s \cdot z2[k+1] - L4 \cdot e[k] \\ -s \cdot z1[k+1] + c \cdot z2[k+1] - L5 \cdot e[k] \end{pmatrix} \quad (21)$$

The equation (22) is obtained by multiplying z1[k] of the equation (21) by z2[k+1], and multiplying z2[k] of the equation (21) by z1[k+1]. Here, the left-side negative sign "−" is given to z2[k].

$$\begin{pmatrix} z1[k]z2[k+1] \\ -z2[k]z1[k+1] \end{pmatrix} = \\ \begin{pmatrix} c \cdot z1[k+1]z2[k+1] + s \cdot z2[k+1]^2 - L4 \cdot z2[k+1]e[k] \\ s \cdot z1[k+1]^2 - c \cdot z1[k+1]z2[k+1] + L5 \cdot z1[k+1]e[k] \end{pmatrix} \quad (22)$$

The equation (23) is obtained by summing up the upper and lower sides of the equation (22).

$$z1[k]z2[k+1] - z2[k]z1[k+1] = s(z1[k+1]^2 + z2[k+1]^2) + (-L4 \cdot z2[k+1] + L5 \cdot z1[k+1])e[k] \quad (23)$$

In the structure of a current observer, $\sin(\omega T)$ should be estimated from the equation (23). More specifically, the disturbance frequency or the disturbance angular frequency ω that is estimated in an analog operation is not estimated, but $\sin(\omega T)$ should be directly estimated in a digital control operation. According to the equation (23), $\sin(\omega T)$ is obtained from the following equation (24):

$$s = \frac{z1[k]z2[k+1] - z2[k]z1[k+1]}{z1[k+1]^2 + z2[k+1]^2} + \frac{L4 \cdot z2[k+1] - L5 \cdot z1[k+1]}{z1[k+1]^2 + z2[k+1]^2} e[k] \quad (24)$$

In the current observer, $\cos(\omega T)$ may be estimated, instead of $\sin(\omega T)$. More specifically, the equation (25) is obtained by multiplying z1[k] of the equation (21) by z1[k+1], and multiplying z2[k] of the equation (21) by z2[k+1].

$$\begin{pmatrix} z1[k]z1[k+1] \\ z2[k]z2[k+1] \end{pmatrix} = \\ \begin{pmatrix} c \cdot z1[k+1]^2 + s \cdot z1[k+1]z2[k+1] - L4 \cdot z1[k+1]e[k] \\ -s \cdot z1[k+1]z2[k+1] + c \cdot z2[k+1]^2 - L5 \cdot z2[k+1]e[k] \end{pmatrix} \quad (25)$$

The equation (26) is obtained by summing up the upper and lower sides of the equation (25).

$$z1[k]z1[k+1] + z2[k]z2[k+1] = c(z1[k+1]^2 + z2[k+1]^2) - (-L4 \cdot z1[k+1] - L5 \cdot z2[k+1])e[k] \quad (26)$$

The disturbance frequency or the disturbance angular frequency ω that is estimated in an analog operation is not estimated, but $\cos(\omega T)$ should be directly estimated in a digital control operation. According to the equation (26), $\cos(\omega T)$ is obtained from the following equation (27).

$$c = \frac{z1[k]z1[k+1] + z2[k]z2[k+1]}{z1[k+1]^2 + z2[k+1]^2} + \frac{L4 \cdot z1[k+1] + L5 \cdot z2[k+1]}{z1[k+1]^2 + z2[k+1]^2} e[k] \quad (27)$$

FIG. 6 illustrates the relationship between the oscillation frequency and the estimated value $\sin(\omega T)$. The solid line represents the estimated value $\sin(\omega T)$, and the dot-and-dash line represents the conventional estimated value ω. Relative to the oscillation frequency represented by the abscissa axis, the conventional estimated value ω exhibits linear characteristics. Compared with the estimated value $\sin(\omega T)$, the conventional estimated value ω has a difference in estimated frequency with respect to the oscillation frequency, and the estimation accuracy of the conventional estimated value ω is low. Therefore, in a digital control operation, the oscillation frequency cannot be accurately estimated by estimating the estimated value ω, and position control adapting to the oscillation frequency is difficult.

In the first embodiment, on the other hand, the oscillation frequency is estimated through $\sin(\omega T)$. Accordingly, in the digital control, the oscillation frequency can be accurately estimated, and position control adapting to the oscillation frequency component can be performed.

Where sin(ωT) is used as the estimated value of the oscillation frequency f in the digital control, the frequency expressed by the following equation (28) is estimated, with Fs representing the sampling frequency in the digital control.

$$\sin(\omega T) = \sin\left(2\pi \cdot \frac{f}{Fs}\right) \quad (28)$$

As illustrated in FIG. 6, a monotonous relationship is observed between the disturbance frequency f and sin(ωT) in the region between 0 and Fs/4, and adaptive following cannot be performed where the oscillation frequency is Fs/4 or higher.

FIG. 7 illustrates the relationship between the oscillation frequency and the estimated value cos(ωT). As illustrated in FIG. 7, where cos(ωT) is used as the estimated value, a monotonous decrease is obtained in the region between and Fs/2. Accordingly, there is not a limit at Fs/4 that is set in the case where sin(ωT) is used as the estimated value.

Where cos(ωT) is used, the curve becomes almost flat in the low frequency zone, and the frequency estimation accuracy becomes poorer. For example, in a case of a sample frequency of 12 kHz, the curve is flat in the low frequency zone around 500 Hz, and the estimation accuracy becomes lower.

Accordingly, sin(ωT) should be used as the estimated value where priority is put on the estimation accuracy on the lower frequency side, and cos(ωT) should be used as the estimated value where priority is put on the estimation accuracy on the higher frequency side.

Furthermore, when the disk apparatus is in use, external oscillations often become a problem on the lower frequency side. For example, external oscillations of several hundreds Hz are often caused from outside. Therefore, in the disk apparatus, it is more convenient to use the estimated value sin(ωT), with which lower frequency oscillations can be estimated with higher accuracy.

The estimator 24 of FIG. 5 estimates sin(ωT) or cos(ωT), and performs adaptive control in the following manner.

In a first adaptive control operation, e[k] of the equation (24) or the equation (27) becomes "0", if accurate estimation is performed, and the control system can suppress the disturbance frequency. Accordingly, the second term of the right side of each of the equations (24) and (27) should become "0".

Therefore, where sin(ωT) is estimated, the second term E[k] of the right side of the equation (24) is calculated according to the following equation (29).

$$E[k] = \frac{L4 \cdot z2[k+1] - L5 \cdot z1[k+1]}{z1[k+1]^2 + z2[k+1]^2} e[k] \quad (29)$$

Next, E[k] of the equation (29) is multiplied by the adaptive gain K, so that sin(ωT) is updated as in the following equation (30).

$$\sin(\omega)[k+1]T) = \sin(\omega[k]T) + K \cdot E[k] \quad (30)$$

Where cos(ωT) is estimated, the second term E[k] of the right side of the equation (27) is calculated according to the following equation (31).

$$E[k] = -\frac{L4 \cdot z1[k+1] + L5 \cdot z2[k+1]}{z1[k+1]^2 + z2[k+1]^2} e[k] \quad (31)$$

Next, E[k] of the equation (31) is multiplied by the adaptive gain K, so that cos(ωT) is updated as in the following equation (32).

$$\cos(\omega[k+1]T) = \cos(\omega[k]T) + K \cdot E[k] \quad (32)$$

In the above described manner, sin(ωT) and cos(ωT) can be adaptively estimated with the use of the five values, z1[k+1], z2[k+1], e[k], L4, and L5.

A calculation in a second adaptive control operation is now described. Where a fixed-point processor is used, the number of digits is limited. If the above five values, z1[k+1], z2[k+1], e[k], L4, and L5, are used, the number of digits in each of the values of z1[k+1] and z2[k+1] differs from the number of digits in each of the values of e[k], L4, and L5. To effectively use the limited number of digits, calculations are performed in the following manner.

Where sin(ωT) is estimated, the first term G[k] of the right side of the equation (24) is calculated according to the following equation (33).

$$G[k] = \frac{z1[k]z2[k+1] - z2[k]z1[k+1]}{z1[k+1]^2 + z2[k+1]^2} \quad (33)$$

The difference E[k] between the current set value sin(ωT) and the equation (33) is calculated according to the following equation (34).

$$E[k] = G[k] - \sin(\omega[k]T) \quad (34)$$

E[k] of the equation (34) is multiplied by the adaptive gain K, so that sin(ωT) is updated as in the following equation (35).

$$\sin(\omega[k+1]T) = \sin(\omega[k]T) + K \cdot E[k] \quad (35)$$

Where cos(ωT) is estimated, the first term G[k] of the right side of the equation (27) is calculated according to the following equation (36):

$$G[k] = \frac{z1[k]z1[k+1] + z2[k]z2[k+1]}{z1[k+1]^2 + z2[k+1]^2} \quad (36)$$

The difference E[k] between the current set value cos(ωT) and the equation (36) is calculated according to the following equation (37).

$$E[k] = G[k] - \cos(\omega[k]T) \quad (37)$$

E[k] of the equation (37) is multiplied by the adaptive gain K, so that cos(ωT) is updated as in the following equation (38).

$$\cos(\omega[k+1]T) = \cos(\omega[k]T) + K \cdot E[k] \quad (38)$$

In the above described manner, sin(ωT) and cos(ωT) can be adaptively estimated only with the use of the four values, z1[k+1], z1[k], z2[k+1], and z2[k].

The compensator 23 illustrated in FIG. 5 is formed with an observer, and calculates the disturbance suppression control amount (current) Udist (or Ud) according to the following equation (39):

$$\begin{pmatrix} Z1[k+1] \\ Z2[k+1] \end{pmatrix} = H \begin{pmatrix} Z1[k] \\ Z2[k] \end{pmatrix} + \begin{pmatrix} L4 \\ L5 \end{pmatrix} e[k], \quad (39)$$

$$Udist[k] = F \cdot \begin{pmatrix} Z1[k] \\ Z2[k] \end{pmatrix},$$

$$H = \begin{pmatrix} \cos(\omega[k]T) & -\sin(\omega[k]T) \\ \sin(\omega[k]T) & \cos(\omega[k]T) \end{pmatrix}$$

Figures 9, 10:
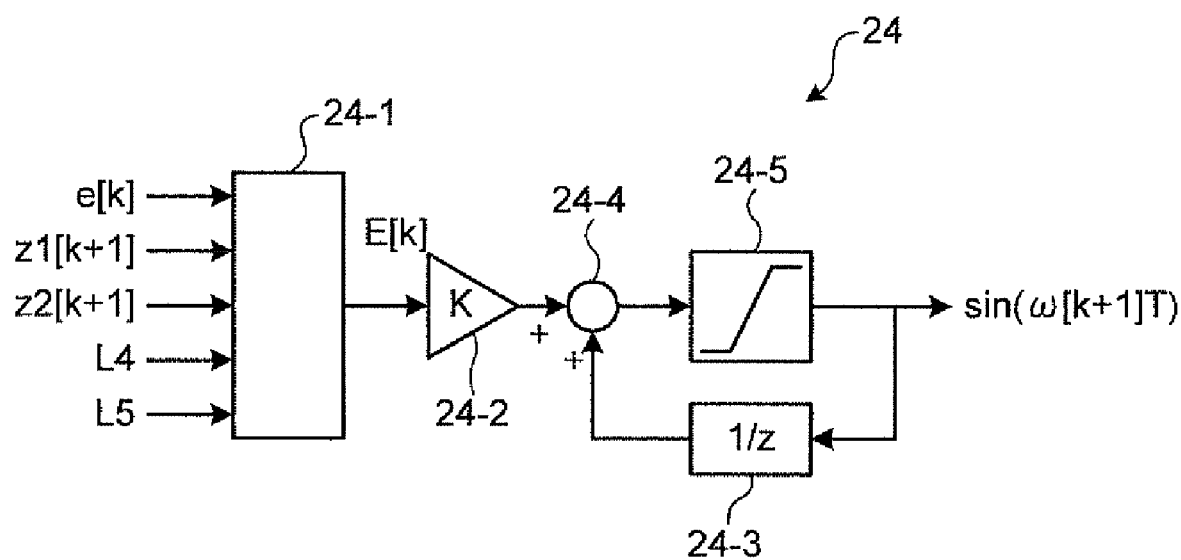
FIG. 9 illustrates an exemplary structure of a table in the structure illustrated in FIG. 8 in the second embodiment.
FIG. 10 is an exemplary diagram of another estimator in the structure illustrated in FIG. 8 in the second embodiment.

The control variable table 25 of FIG. 5 stores the values of $\sin(\omega T)$ or $\cos(\omega T)$ to be used in the equation (39), and the corresponding values of L4, L5, and $\cos(\omega T)$ or $\sin(\omega T)$, as illustrated in FIG. 9.

Accordingly, for each sample, the values of L4, L5, and $\cos(\omega T)$ or $\sin(\omega T)$ corresponding to $\sin(\omega T)$ or $\cos(\omega T)$ calculated by the estimator 24 are read from the control variable table 25, and are set into the compensator 23. Based on the set control constants and the position error, the compensator 23 calculates the disturbance suppression control amount Udist according to the equation (39), and outputs the disturbance suppression control amount Udist to the addition module 26.

Accordingly, where position control adapting to a disturbance frequency is performed in a digital position control system, the oscillation frequency is accurately estimated, so that position control adapting to the oscillation frequency component can be performed.

Figure 8:
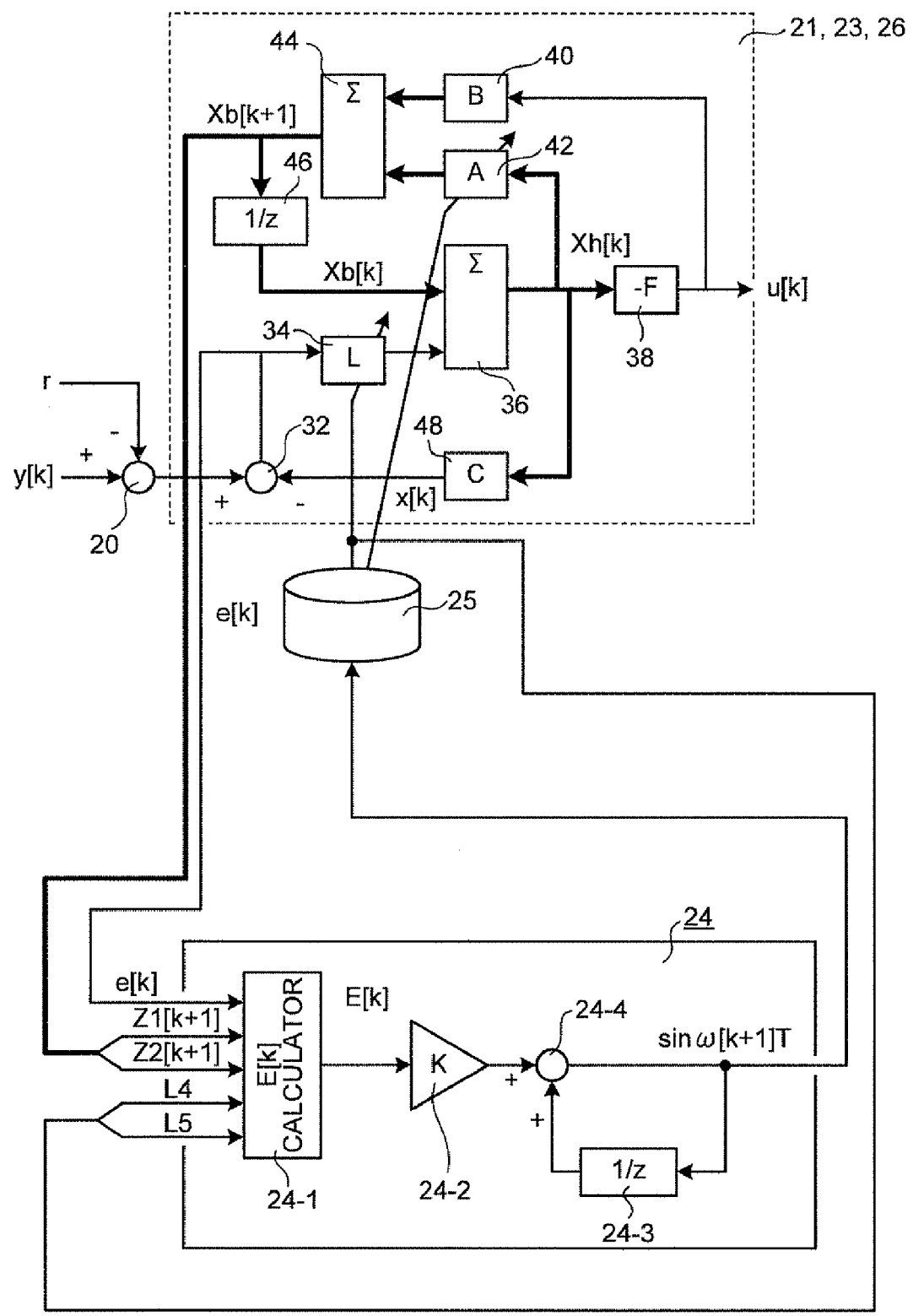
FIG. 8 is an exemplary block diagram of a position control system having a disturbance suppression compensator according to a second embodiment of the invention.

FIG. 8 is a block diagram of a position control system of a second embodiment. FIG. 9 is an explanatory diagram of the control variable table of FIG. 8. The structure illustrated in FIG. 8 is an example in which the controller 21 and the compensator 23 are formed with an integral current observer. Also, in this example, the estimator 24 utilizes the calculation method of the first adaptive control.

The position control system of FIG. 8 is a current observer that performs disturbance suppression expressed by the following equations (40), (41), and (42), so as to detect the disturbance frequency and suppress disturbance through adaptive control.

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (40)$$

$$u(k) = -(F1 \; F2 \; F3 \; F4 \; F5) \begin{pmatrix} x(k) \\ v(k) \\ b(k) \\ z1(k) \\ z2(k) \end{pmatrix} \quad (41)$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a21 \\ 0 & 0 & 0 & a21 & a22 \end{pmatrix} \begin{pmatrix} x(k) \\ v(k) \\ b(k) \\ z1(k) \\ z2(k) \end{pmatrix} + \frac{B1}{m} \frac{1}{Lp} T^2 \begin{pmatrix} 1/2 \\ 1 \\ 0 \\ 0 \\ 0 \end{pmatrix} u(k) \quad (42)$$

In the equation (42), a11 through a22 represent the values of sine and cosine in the equations (9) and (18).

In other words, the second embodiment is an example of a position control system that is formed with an observer involving a controller model and a disturbance model. In FIG. 8, the same components and parts as those illustrated in FIG. 5 are denoted by the same reference numerals and symbols as those used in FIG. 5.

In FIG. 8, the first arithmetic module 20 subtracts the target position r from an observed position y[k] obtained by demodulating the above described servo information read by the head 3 (see FIG. 1), to determine an actual position error er[k].

A second arithmetic module 32 subtracts an estimated position x[k] of the observer from the actual position error er[k], to determine an estimated position error e[k]. A state estimating module 34 uses the estimated position error e[k] and the estimated gains L (L1, L2, L3, L4, and L5) as interval variables of the equation (40), to determine estimated correction values (the second term of the right side of the equation (40)).

An addition module 36 adds the estimated correction value to the state quantities from a delay module 46 (the first terms of the right side of the equation (40)) x[k], v[k], b[k], z1[k], and z2[k], so as to determine an estimated position x[k], an estimated velocity v[k], an estimated bias value b[k], and estimated disturbance suppression values z1[k] and z2[k] as in the equation (40). In the equation (40), the estimated position error e[k] is represented by (y[k]−x[k]).

The estimated values are multiplied by a state feedback gain (−Fa=F1, F2, F3, F4, and F5) at a fourth arithmetic module 38, to obtain the driving value u[k] of the actuator 1, as in the equation 41. Meanwhile, the estimated value of the equation (40) from the addition module 36 is multiplied by an estimated gain Aa (the matrix of the first term of the right side of the equation (42)) at a fifth arithmetic module 42.

The driving value u[k] of the fourth arithmetic module 38 is multiplied by an estimated gain B (by which u [k] of the second term of the right side of the equation (42) is multiplied) at a sixth arithmetic module 40. The two multiplication results are added to each other at an addition module 44, to obtain estimated state quantities x[k+1], v[k+1], b[k+1], z1[k+1], and z2[k+1] of the next sample of the equation (42).

As described above, the estimated state quantities of the next samples are input to the delay module 46, and are corrected with the estimated correction values at the state estimating module 34. At a seventh arithmetic module 48, the estimated position x[k] is extracted from the estimated value of the equation (41) from the addition module 36, and is input to the second arithmetic module 32.

The estimator 24 and the control variable table 25 are given to the current observer. The estimator 24 calculates $\sin(\omega T)$ according to the equations (29) and (30), which are the first adaptive law of $\sin(\omega T)$. More specifically, in the estimator 24, an estimated error (E[k]) calculator 24-1 receives the estimated position error e[k], the estimated state quantities z1[k+1] and z2[k+1], and the estimated gains L4 and L5. According to the equation (29), the estimated error calculator 24-1 calculates and outputs an estimated error E[k].

Again multiplier 24-2 multiplies the estimated error E[k] by a gain Ka, and calculates the second term of the right side of the equation (30). An adder 24-4 adds $\sin(\omega[k]T)$ of the previous sample from a delay module 24-3 to the output of the gain multiplier 24-2, and outputs $\sin(\omega[k+1]T)$ of the equation (30). The $\sin(\omega[k+1]T)$ is delayed by one sample at the delay module 24-3, and is input to the adder 24-5.

The output sin(ω[k+1]T) of the frequency estimator 24 is input to the control variable table 25. As illustrated in FIG. 9, the control variable table 25 stores the values of the estimated gains L1, , L2, L3, L4, and L5, and the values of cos(ωT) corresponding to the estimated values of sin(ωT). As illustrated in FIG. 6, the region of 0 to Fs/4 is used. Therefore, in the table illustrated in FIG. 9, thirty-three values of sin(ωT) are allotted within the range of 0 to Fs/4.

The control variable table 25 extracts the estimated gain L and cos(ωT) corresponding to the estimated value sin(ωT), and sets the extracted values in the modules 34 and 42. In this manner, the estimated gains L1 through L5 of the equation (40) of the module 34 and the control constants a11 through a22 (=cos(ωT) or sin(ωT)) of the equation (42) of the module 42 are updated, and the disturbance suppression characteristics of the observer are changed in accordance with the disturbance frequency.

As described above, where a current observer is used, designing is easy, and the disturbance suppression function can be readily set. Also, in a case where the frequency estimator 24 estimates cos(ωT), the calculations can be performed with the same structure as above.

FIG. 10 is a block diagram of another frequency estimator 24 in the structure illustrated in FIG. 8. In FIG. 10, the same components and parts as those in FIG. 8 are denoted by the same reference numerals and symbols as those used in FIG. 8.

As described above, the values of sin(ωT) corresponding to the frequency range of 0 to Fs/4 fall into the range of 0 to 1. Therefore, the estimated value of sin(ωT) needs to be always restricted within the range of 0 to 1. In the embodiment, a clip module 24-5 is provided to restrict the output of the addition module 24-4 within the range of 0 to 1.

If the input sin(ωT) is smaller than "0", a clip module (a saturation processing module) 24-5 restricts sin(ωT) to "0". If the input sin(ωT) is larger than "1", the clip module 24-5 restricts sin(ωT) to "1". Accordingly, even if sin(ωT) is estimated from the state variables, a disturbance frequency component within the frequency range illustrated in FIG. 6 can be obtained.

Where cos(ωT) is estimated, the same effects as above can be achieved by restricting the clipping range to "−1" to "+1".

Figure 11:
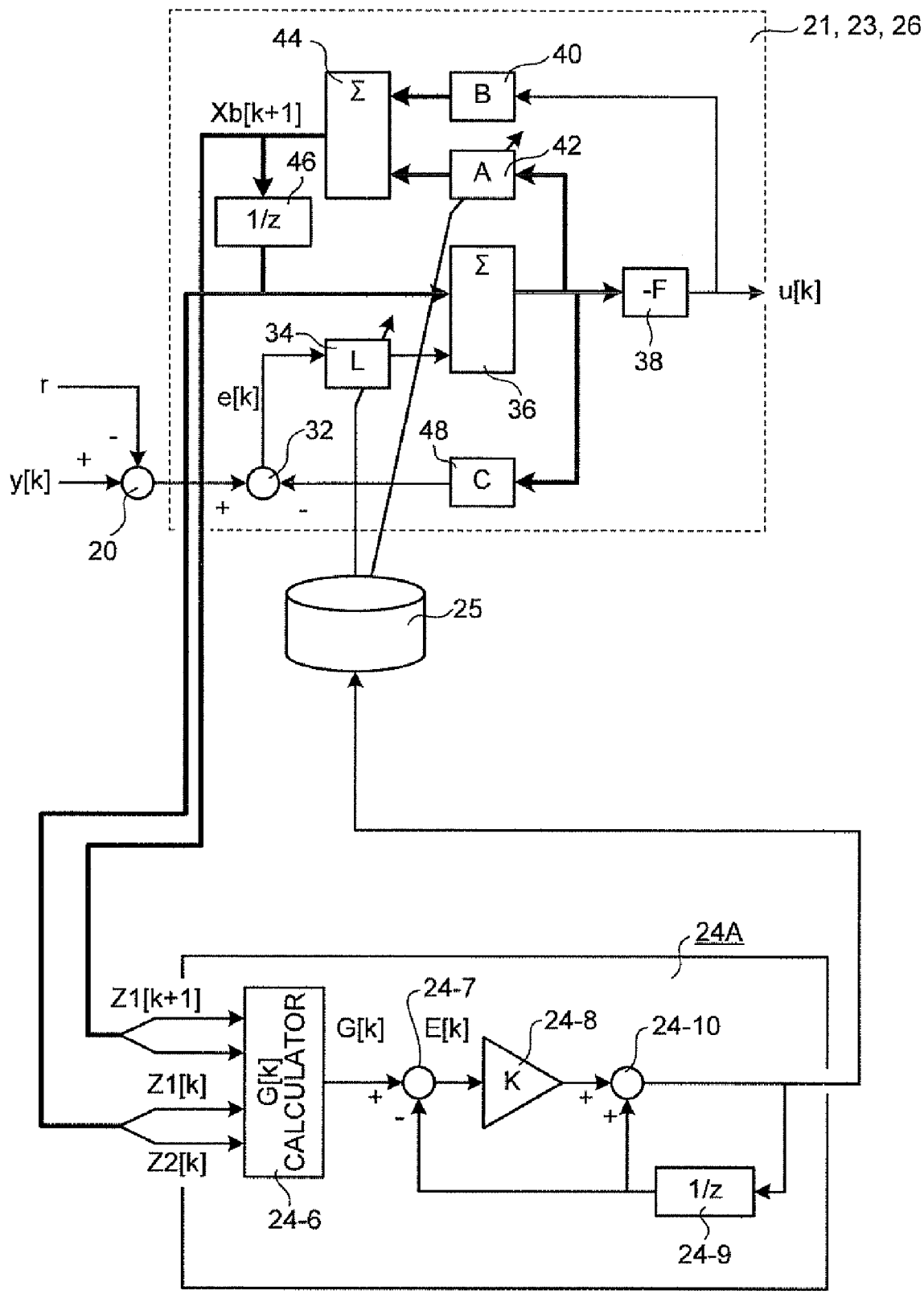
FIG. 11 is an exemplary block diagram of a position control system having a disturbance suppression compensator according to a third embodiment of the invention.

FIG. 11 is a block diagram of a position control system of a third embodiment. The structure illustrated in FIG. 11 is an example in which the controller 21 and the compensator 23 are formed with an integral current observer. Also, in this example, a sin(ωT) estimator 24A utilizes the calculation method of the second adaptive control.

In FIG. 11, the same components and parts as those illustrated in FIG. 8 are denoted by the same reference numerals and symbols as those used in FIG. 8. Like the position control system of FIG. 8, the position control system of FIG. 11 is a current observer involving the bias compensation expressed by the above equations (40), (41), and (42), so as to suppress a disturbance by detecting the disturbance frequency and performing adaptive control. Therefore, explanation of the current observers 21, 23, and 26 is omitted herein.

As illustrated in FIG. 11, the frequency estimator 24A and the control variable table 25 are given to the current observer. The frequency estimator 24A calculates sin(ωT) according to the equations (33) through (35), which is the second adaptive law of sin(ωT). More specifically, in the frequency estimator 24A, an estimated error calculator 24-6 receives the estimated state quantities z1[k], z1[k+1], z2[k], and z2[k+1]. According to the equation (33), the estimated error calculator 24-6 calculates and outputs a first estimated error G[k].

A first arithmetic module 24-7 subtracts sin(ω[k]T) of one previous sample supplied from a delay module 24-9 from the first estimated error G[k], and outputs a second estimated error E[k] of the equation (34).

A gain multiplier 24-8 multiplies the second estimated error E[k] by a gain K, and calculates the second term of the right side of the equation (35). An adder 24-10 adds sin(ω[k]T) of the previous sample from the delay module 24-9 to the output of the gain multiplier 24-S, and outputs the sin(ω[k+1]T) of the equation (35). The sin(ω[k+1]T) is delayed by one sample at the delay module 24-9, and is input to the arithmetic module 24-7 and the adder 24-10.

The output sin(ω[k+1]T) of the frequency estimator 24A is input to the control variable table 25. As illustrated in FIG. 9, the control variable table 25 stores the values of the estimated gains L1, L2, L3, L4, and L5, and the values cos(ωT) corresponding to estimated values sin(ωT). As illustrated in FIG. 6, the region of 0 to Fs/4 is used for sin(ωT). Therefore, in the table illustrated in FIG. 9, thirty-three values of sin(ωT) are allotted within the range of 0 to Fs/4.

The control variable table 25 extracts the estimated gain L and cos(ωT) corresponding to the estimated value sin(ωT), and sets the extracted values in the modules 34 and 42. In this manner, the estimated gains L1 through L5 of the equation (40) of the module 34 and the control constants a11 through a22 (=cos(ωT) or sin(ωT)) of the equation (42) of the module 42 are updated, and the disturbance suppression characteristics of the observer are changed in accordance with the disturbance frequency.

As described above, where a current observer is used, designing is easy, and the disturbance suppression function can be readily set. Since the second adaptive law is used, there is not a difference in the number of digits among inputs. Even if a fixed-point processor is used, calculations can be performed with high precision. Further, where the frequency estimator 24A estimates cos(ωT), the equations (36) through (38) can be calculated with the same structure as above.

Figure 12:
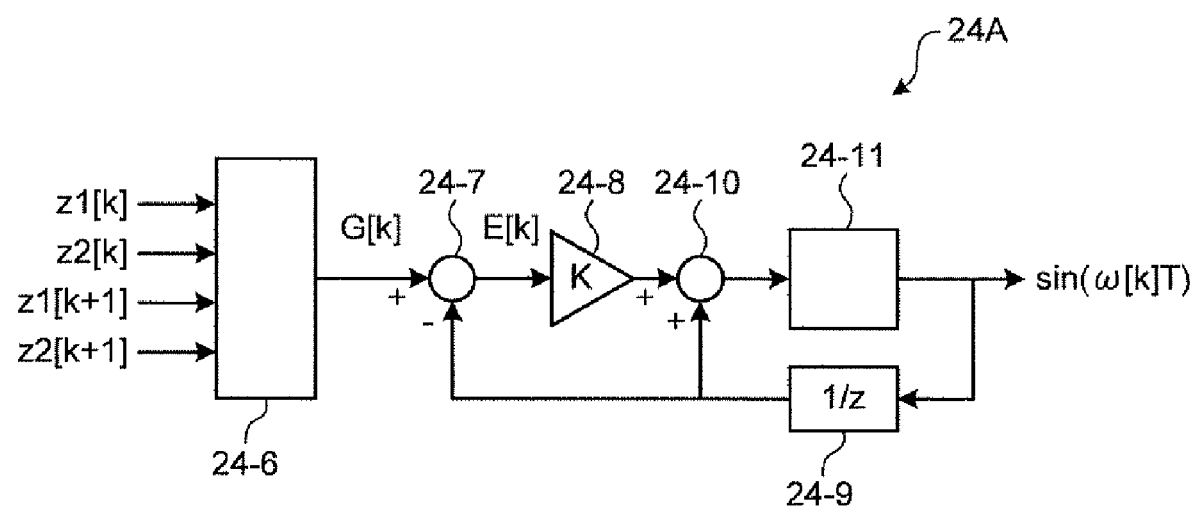
FIG. 12 illustrates the structure of another sin(ωT) estimator in the structure of FIG. 11.

FIG. 12 is a block diagram of another embodiment of the frequency estimator 24A of FIG. 11. In FIG. 12, the same components and parts as those in FIGS. 8, 10, and 11 are denoted by the same reference numerals and symbols as those used in FIGS. 8, 10, and 11.

As described above, the values of sin(ωT) corresponding to the frequency range of 0 to Fs/4 fall into the range of "0" to "1". Therefore, the estimated value of sin(ωT) needs to be always restricted within the range of "0" to "1". In the embodiment, a clip module 24-11 that restricts the output of the addition module 24-10 within the range of "0" to "1" is provided in the same structure as that illustrated in FIG. 11.

If the input sin(ωT) is smaller than "0", the clip module (a saturation processing module) 24-11 restricts sin(ωT) to "0". If the input sin(ωT) is larger than "1", the clip module 24-11 restricts sin(ωT) to "1". Accordingly, if sin(ωT) is estimated from a state variable, a disturbance frequency component within the frequency range of FIG. 6 can be obtained.

Where cos(ωT) is estimated, the same effects as above can be achieved by restricting the clipping range to "−1" to "+1".

Figure 13:
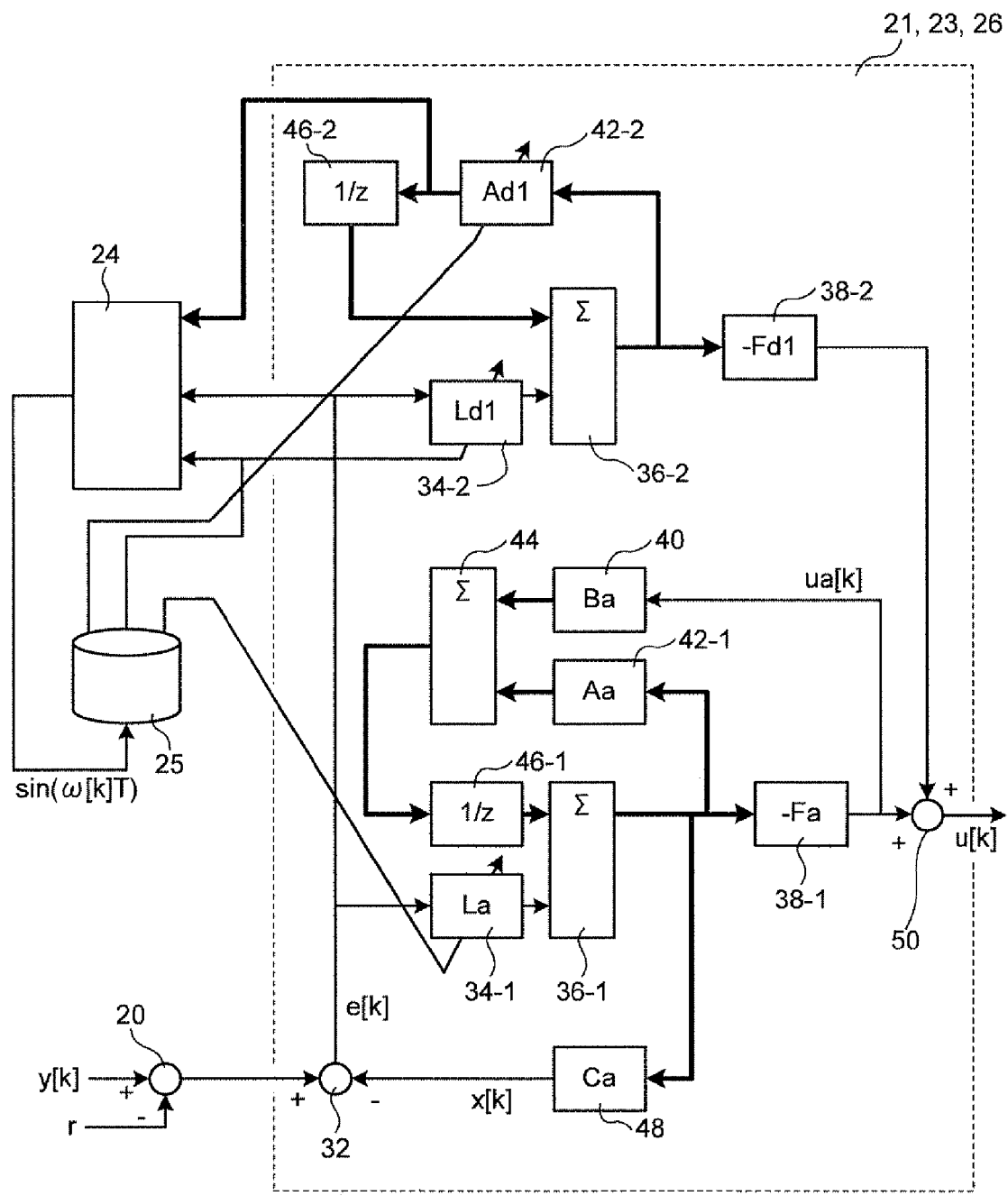
FIG. 13 is an exemplary block diagram of a position control system having a disturbance suppression compensator according to a fourth embodiment of the invention.

FIG. 13 is a block diagram of a position control system of a fourth embodiment. The structure illustrated in FIG. 13 is an example in which the controller 21 and the compensator 23 are formed with separate current observers. Also, in the forth embodiment, the estimator 24 utilizes the calculation method of the first adaptive control.

The position control system of FIG. 13 is a current observer that performs disturbance suppression expressed by the following equations (43), (44), (45), (46), and (47), by detecting the disturbance frequency and suppressing disturbances through adaptive control.

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (43)$$

$$u(k) = -(F1 \; F2) \begin{pmatrix} x(k) \\ v(k) \end{pmatrix} \quad (44)$$

$$uout(k) = u(k) - (F3 \; F4 \; F5) \begin{pmatrix} b(k) \\ z1(k) \\ z2(k) \end{pmatrix} \quad (45)$$

$$\begin{pmatrix} x(k+1) \\ v(k+1) \end{pmatrix} = \begin{pmatrix} 1 & 1 \\ 0 & 1 \end{pmatrix} \begin{pmatrix} x(k) \\ v(k) \end{pmatrix} + \frac{B1}{m} \frac{1}{Lp} T^2 \begin{pmatrix} 1/2 \\ 1 \end{pmatrix} u(k) \quad (46)$$

$$\left. \begin{array}{l} b(k+1) = b(k) \\ \begin{pmatrix} z1(k+1) \\ z2(k+1) \end{pmatrix} = \begin{pmatrix} a11 & a12 \\ a21 & a22 \end{pmatrix} \begin{pmatrix} z1(k) \\ z2(k) \end{pmatrix} \end{array} \right\} \quad (47)$$

In the equation (47), a11 through a22 represent the values of sine and cosine of the equations (9) and (18).

In other words, the fourth embodiment is an example of a position control system that is formed with observers including a controller model and a disturbance model. In FIG. 13, the same components and parts as those illustrated in FIGS. 5, 8, and 11 are denoted by the same reference numerals and symbols as those used in FIGS. 5, 8, and 11.

In FIG. 13, a first arithmetic module 20 subtracts a target position r from an observed position y[k] obtained by demodulating the above described servo information read by a head 3 (see FIG. 1), to determine an actual position error er[k].

A second arithmetic module 32 subtracts an estimated position x[k] of the observer from the actual position error er[k] to determine an estimated position error e[k]. A state estimating module 34-1 uses the estimated position error e[k] and the estimated gains L (L1 and L2) as interval variables of the equation (43), to determine estimated correction values (the second term of the right side of the equation (43)).

An addition module 36-1 adds the estimated correction value to the state quantities x[k] and v[k] from a delay module 46-1 (the first terms of the right side of the equation (40)), so as to determine an estimated position x[k] and an estimated velocity v[k], as in the equation (43). In the equation (43), the estimated position error e[k] is represented by (y[k]−x[k]).

The estimated values are multiplied by state feedback gains (−Fa=F1 and F2) at a third arithmetic module 38-1, to obtain the driving value u[k] of the actuator 1, as in the equation (44). Meanwhile, the estimated value of the equation (43) from the addition module 36-1 is multiplied by an estimated gain Aa (the matrix of the first term of the right side of the equation (46)) at a fourth arithmetic module 42-1.

The driving value u[k] of the third arithmetic module 38-1 is multiplied by an estimated gain B (by which u[k] of the second term of the right side of the equation (46) is multiplied) at a fifth arithmetic module 40. The two multiplication results are added to each other at an addition module 44, to obtain estimated state quantities x[k+1] and v[k+1] of the next sample of the equation (46).

As described above, the estimated state quantities of the next samples are input to the delay module 46-1, and are corrected with the estimated correction values at the state estimating module 34-1. At a sixth arithmetic module 48, the estimated position x[k] is extracted from the estimated value of the equation (46) from the addition module 36-1, and is input to the second arithmetic module 32.

Likewise, in the disturbance model, a second state estimating module 34-2 uses the estimated position error e[k] and the estimated gains Ld1 (L3, L4, and L5) as interval variables of the equation (43), to determine estimated correction values (the second term of the right side of the equation (43)).

A second addition module 36-2 adds the estimated correction values to the state quantities b[k], z1[k], and z2[k] from a second delay module 46-2 (the first terms of the right side of the equation (40)), so as to determine an estimated bias b[k] and estimated disturbance quantities z1[k] and z2[k] as the equation (43).

The estimated values are multiplied by state feedback gains (−Fd1=F3, F4, and F5) at a seventh arithmetic module 38-2, to obtain the disturbance suppression driving value ud[k] of the actuator 1, as in the equation (45). Meanwhile, the estimated value of the equation (43) from the second addition module 36-2 is multiplied by an estimated gain Ad1 (the matrix of the right side of the equation (47)) at an eighth arithmetic module 42-2.

A ninth arithmetic module 50 adds the driving value ud[k] of the seventh arithmetic module 38-2 to the driving value u[k] of the third arithmetic module 38-1, and outputs the driving value u[k] of the actuator.

In fourth embodiment, the frequency estimator 24 and the control variable table 25 are also given to the current observers. The frequency estimator 24 is the same as that illustrated in FIGS. 8 and 10. The control variable table 25 is the same as that illustrated in FIG. 9.

The control variable table 25 sets the estimated gains L1 and L2 corresponding to the estimated value sin(ωT) in the state estimating module 34-1, and sets the estimated gains L3, L4, and L5, and cos(ωT) in the modules 34-2 and 42-2. In this manner, the estimated gains L1 through L5 of the equation (43) of the modules 34-1 and 34-2, and the control constants a11 through a22 (=cos(ωT) or sin(ωT)) of the equation (47) of the module 42-2 are updated, and the disturbance suppression characteristics of the observers are changed in accordance with the disturbance frequency.

As described above, where a disturbance model is formed with an independent current observer, the designing of the disturbance model is easy, and the disturbance suppression function can be readily set. Also, where the frequency estimator 24 estimates cos(ωT), calculations can be performed with the same structure as above.

Figure 14:
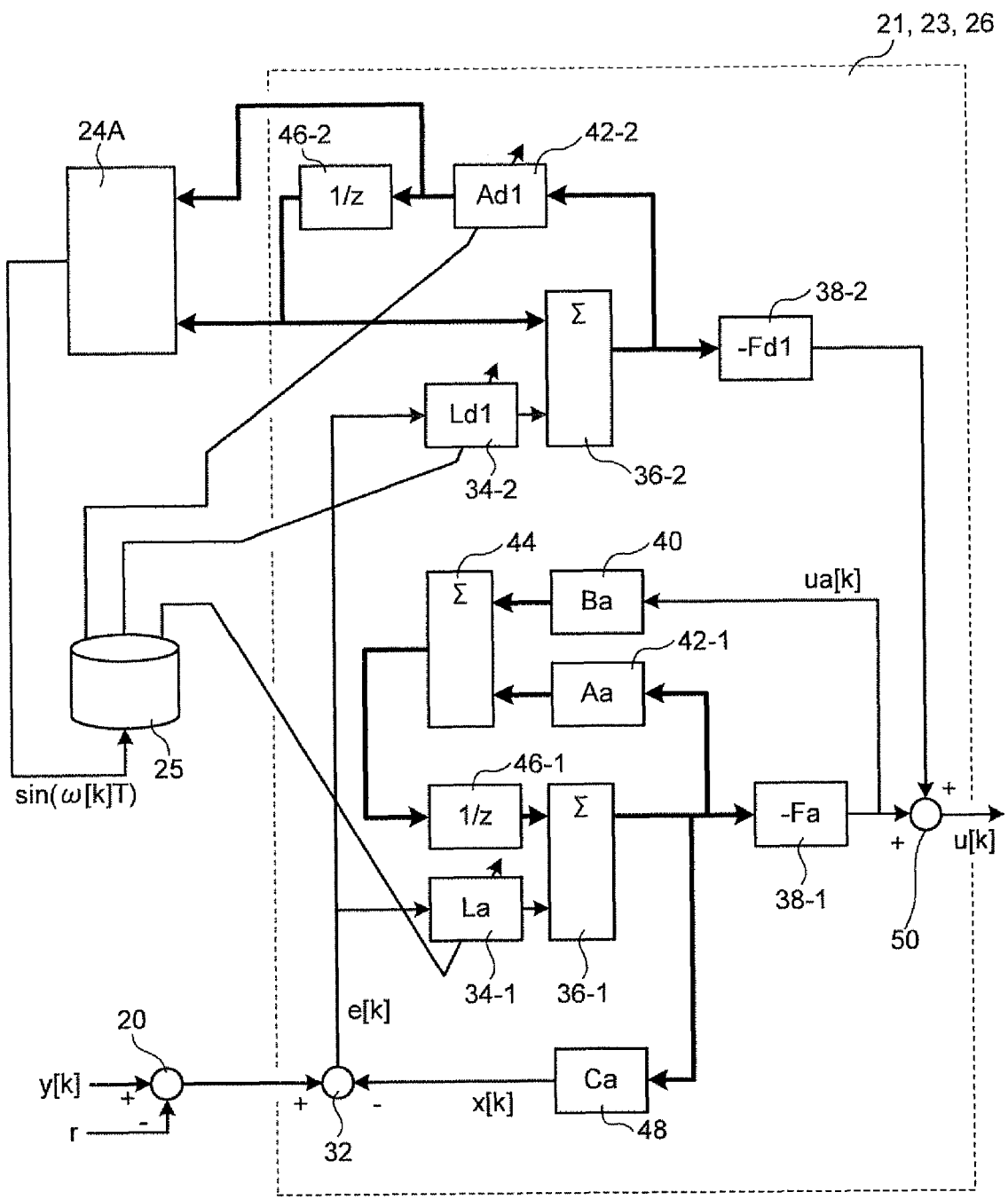
FIG. 14 is an exemplary block diagram of a position control system having a disturbance suppression compensator according to a fifth embodiment of the invention.
Figure 15:
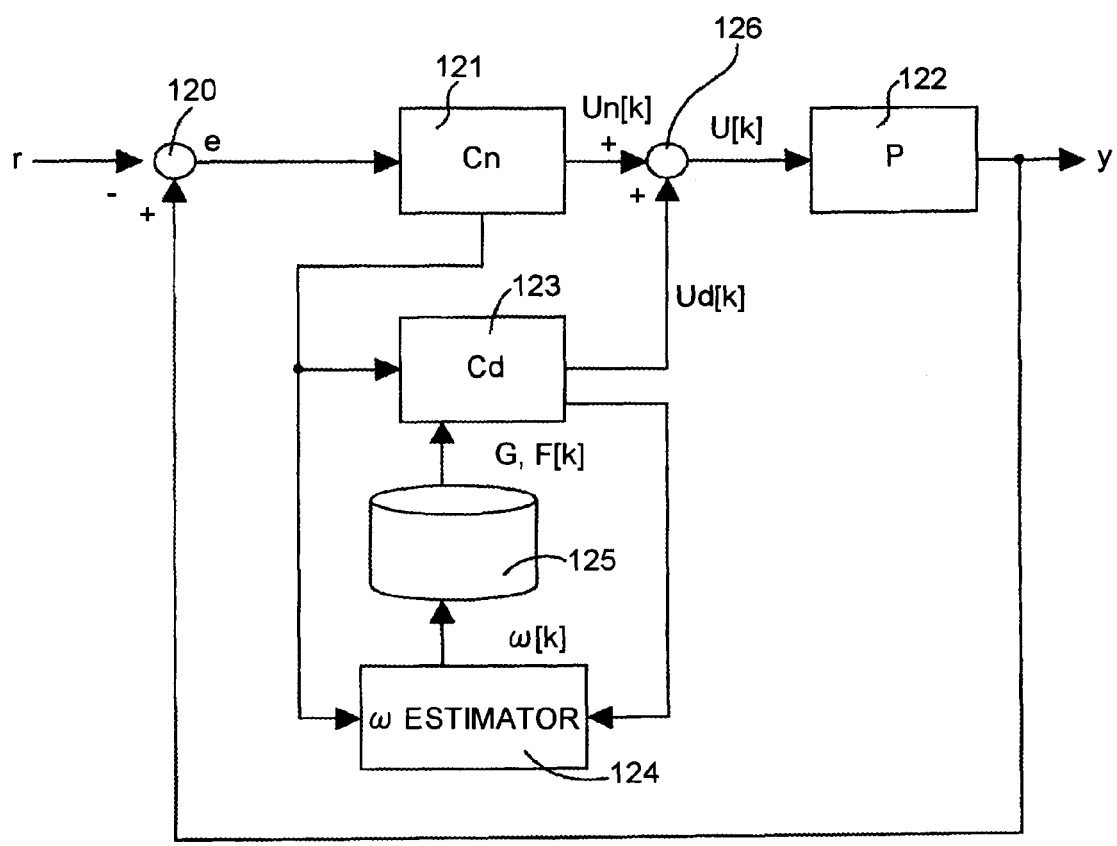
FIG. 15 is an exemplary block diagram of a conventional position control system having a disturbance adaptive control function according to other embodiments of the invention.
Figure 16:
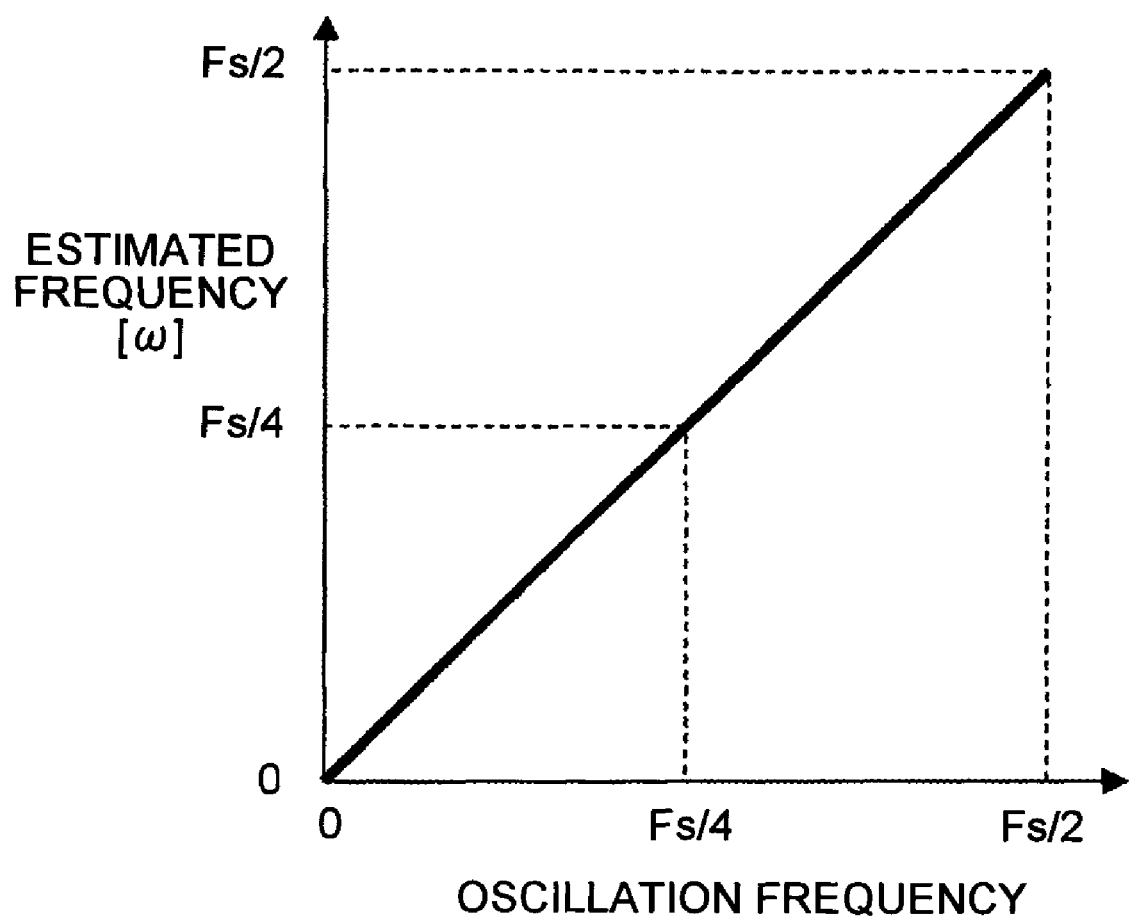
FIG. 16 is an exemplary explanatory diagram of the conventional disturbance frequency estimation in the structure illustrated in FIG. 15 in the other embodiments.

FIG. 14 is a block diagram of a position control system of a fifth embodiment. The structure illustrated in FIG. 14 is an example in which the controller 21 and the compensator 23 are formed with separate current observers. Also, in the fifth embodiment, the estimator 24A utilizes the calculation method of the second adaptive control.

In FIG. 14, the same components and parts as those illustrated in FIGS. 11 and 13 are denoted by the same reference numerals and symbols as those used in FIGS. 11 and 13. The position control system of FIG. 14 is a current observer that performs disturbance suppression expressed by the above equations (43), (44), (45), (46), and (47), so as to detect the disturbance frequency and suppress disturbance through adaptive control.

In other words, the fifth embodiment is an example of a position control system that is formed with observers including a controller model and a disturbance model, like the example illustrated in FIG. 13. Therefore, explanation of the observers is omitted herein.

In the fifth embodiment, the frequency estimator 24A and the control variable table 25 are also given to the current observers. The frequency estimator 24A is the same as that illustrated in FIGS. 11 and 12. The control variable table 25 is the same as that illustrated in FIG. 9.

The control variable table 25 sets the estimated gains L1 and L2 corresponding to the estimated value $\sin(\omega T)$ in the state estimating module 34-1, and sets the estimated gains L3, L4, and L5, and $\cos(\omega T)$ in the modules 34-2 and 42-2. In this manner, the estimated gains L1 through L5 of the equation (47) of the modules 34-1 and 34-2, and the control constants a11 through a22 ($=\cos(\omega T)$ or $\sin(\omega T)$) of the equation (47) of the module 42-2 are updated, and the disturbance suppression characteristics of the observers are changed in accordance with the disturbance frequency.

As described above, where a disturbance model is formed with an independent current observer, the designing of the disturbance model is easy, and the disturbance suppression function can be readily set. Also, where the frequency estimator 24A estimates $\cos(\omega T)$, calculations can be performed with the same structure as above.

In the above descriptions, the compensator 23 is formed with an observer. However, the compensator 23 of FIG. 5 may be formed with a filter. The following is a description of the adaptive law implemented in that case. First, where a filter is used, a filter that corrects the input gains L is used, and the equations on which the correction is based are the same as the equation (8) and the following equations of a predictive observer.

The upper side of the equation (10) is multiplied by z2[k], and the lower side of the equation (10) is multiplied by −z1[k], to obtain the following equation (48).

$$\begin{pmatrix} z2[k]z1[k+1] - \\ z1[k]z2[k+1] \end{pmatrix} = \begin{pmatrix} c \cdot z1[k]z2[k] - s \cdot z2[k]^2 + L4 \cdot z2[k]e[k] \\ -s \cdot z1[k]^2 - c \cdot z1[k]z2[k] - L5 \cdot z1[k]e[k] \end{pmatrix} \quad (48)$$

In the equation (48), a11 through a22 of the equation (10) are substituted by sine and cosine of the equations (9) and (18), and sine and cosine are represented by "s" and "c", respectively.

By summing up the upper side and the lower side of the equation (48), the following equation (49) is obtained.

$$z2[k]z1[k+1] - z1[k]z2[k+1] = -s(z1[k]^2 + z2[k]^2) + (L4 \cdot z2[k] - L5 \cdot z1[k])e[k] \quad (49)$$

Based on the equation (49), $\sin(\omega T)$ ($=s$) is calculated according to the following equation (50).

$$s = \frac{z1[k]z2[k+1] - z2[k]z1[k+1]}{z1[k]^2 + z2[k]^2} + \frac{L4 \cdot z2[k] - L5 \cdot z1[k]}{z1[k]^2 + z2[k]^2} e[k] \quad (50)$$

The equation (50) is set as the adaptive law of the $\sin(\omega T)$ estimator 24 of FIG. 5.

Next, $\cos(\omega T)$ estimation is described.

The upper side of the equation (10) is multiplied by z1[k], and the lower side of the equation (10) is multiplied by z2[k], to obtain the following equation (51).

$$\begin{pmatrix} z1[k]z1[k+1] \\ z2[k]z2[k+1] \end{pmatrix} = \begin{pmatrix} c \cdot z1[k]^2 - s \cdot z1[k]z2[k] + L4 \cdot z1[k]e[k] \\ s \cdot z1[k]z2[k] + c \cdot z2[k]^2 - L5 \cdot z2[k]e[k] \end{pmatrix} \quad (51)$$

In the equation (51), a11 through a22 of the equation (10) are substituted by sine and cosine of the equations (9) and (18), and sine and cosine are represented by "s" and "c", respectively.

By summing up the upper side and the lower side of the equation (51), the following equation (52) is obtained.

$$z1[k]z1[k+1] + z2[k]z2[k+1] = c(z1[k]^2 + z2[k]^2) + (L4 \cdot z1[k] + L5 \cdot z2[k])e[k] \quad (52)$$

Based on the equation (52), $\cos(\omega T)$ ($=c$) is calculated according to the following equation (53).

$$c = \frac{z1[k]z1[k+1] + z2[k]z2[k+1]}{z1[k]^2 + z2[k]^2} - \frac{L4 \cdot z1[k] + L5 \cdot z2[k]}{z1[k]^2 + z2[k]^2} e[k] \quad (53)$$

The equation (53) is set as the adaptive law of the estimator 24 of FIG. 5.

As for the sine and cosine components in a case where a filter is used as described above, z1[k] and z2[k] of the denominators differ from those of the equation of current observers. Also, the numerators of the second terms of the right sides of the equations (50) and (53) also differ from those of the equations of current observers, in having z1[k] and z2[k].

As mentioned above, a value of estimated error of $\sin(\omega T)$ or $\cos(\omega T)$ is calculated with $\omega$ representing an angular frequency of a disturbance and T representing the sampling period to perform the disturbance adaptive control. Therefore, the estimation accuracy of the disturbance frequency can be improved, thereby the disturbance adaptive control can be realized with high accuracy.

Although the above position control devices are designed for heads, the position control device may also be applied to other position control devices. Likewise, although the disk devices are magnetic disk devices in the above embodiments, the disk device may also be applied to other data storage devices.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A position control apparatus configured to perform position control on an object with the use of an actuator in accordance with a position of the object, comprising:
 a digital control module configured to perform position control including disturbance adaptive control with a predetermined sampling period using a control constant, in accordance with a position error between a target position and a current position of the object; and
 a table configured to store the control constant corresponding to a value of $\sin(\omega T)$ or $\cos(\omega T)$, with $\omega$ representing an angular frequency of a disturbance, T representing the sampling period,
 wherein the digital control module is configured to determine a control value of the actuator in accordance with the position error, calculates the value of $\sin(\omega T)$ or $\cos(\omega T)$ according to an adaptive law from a signal based on the position error, reads the corresponding control constant from the table in accordance with the calculated value of $\sin(\omega T)$ or $\cos(\omega T)$, and updates the control constant, to perform the position control including the disturbance adaptive control.

2. The position control apparatus of claim 1, wherein the digital control module performs the position control including the disturbance adaptive control through observer control.

3. The position control apparatus of claim 2, wherein the digital control module calculates an error from a state variable of the observer, an estimated gain, and an estimated position error, and adds the estimated error to the value of $\sin(\omega T)$ or $\cos(\omega T)$, to update the value of $\sin(\omega T)$ or $\cos(\omega T)$.

4. The position control apparatus of claim 3, wherein the digital control module determines the value of $\sin(\omega T)$ according to the following equations (29) and (30), or determines the value of $\cos(\omega T)$ according to the following equations (31) and (32):

$$E[k] = \frac{L4 \cdot z2[k+1] - L5 \cdot z1[k+1]}{z1[k+1]^2 + z2[k+1]^2} e[k] \quad (29)$$

$$\sin(\omega[k+1]T) = \sin(\omega[k]T) + K \cdot E[k] \quad (30)$$

$$E[k] = -\frac{L4 \cdot z1[k+1] + L5 \cdot z2[k+1]}{z1[k+1]^2 + z2[k+1]^2} e[k] \quad (31)$$

$$\cos(\omega[k+1]T) = \cos(\omega[k]T) + K \cdot E[k] \quad (32)$$

5. The position control apparatus of claim 2, wherein the digital control module calculates an error from a state variable of a current sample of the observer and a state variable of a next sample, to update the value of $\sin(\omega T)$ or $\cos(\omega T)$.

6. The position control apparatus of claim 5, wherein the digital control module determines the value of $\sin(\omega T)$ according to the following equations (33) through (35), or determines the value of $\cos(\omega T)$ according to the following equations (36) through (38):

$$G[k] = \frac{z1[k]z2[k+1] - z2[k]z1[k+1]}{z1[k+1]^2 + z2[k+1]^2} \quad (33)$$

$$E[k] = G[k] - \sin(\omega[k]T) \quad (34)$$

$$\sin(\omega[k+1]T) = \sin(\omega[k]T) + K \cdot E[k] \quad (35)$$

$$G[k] = \frac{z1[k]z1[k+1] + z2[k]z2[k+1]}{z1[k+1]^2 + z2[k+1]^2} \quad (36)$$

$$E[k] = G[k] - \cos(\omega[k]T) \quad (37)$$

$$\cos(\omega[k+1]T) = \cos(\omega[k]T) + K \cdot E[k] \quad (38)$$

7. The position control apparatus of claim 2, wherein
 the table stores a state estimating gain of the observer corresponding to the estimated value of $\sin(\omega T)$ or $\cos(\omega T)$, and
 the digital control module updates a state estimating gain of the observer as the control constant with the use of a state estimating gain read from the table.

8. The position control apparatus of claim 1, wherein the digital control module performs clipping, so as to restrict the calculated value of $\sin(\omega T)$ or $\cos(\omega T)$ within a predetermined range.

9. The position control apparatus of claim 1, wherein
 the digital control module includes:
 a control module configured to calculate the control value of the actuator in accordance with the position error; and
 a disturbance adaptive control module configured to calculate the value of $\sin(\omega T)$ or $\cos(\omega T)$ according to the adaptive law, and calculate a disturbance adaptive control value with the use of the control constant that is read from the table in accordance with the calculated value of $\sin(\omega T)$ or $\cos(\omega T)$, and
 the actuator is driven with the control value of the control module and the disturbance adaptive control value.

10. A disk apparatus comprising:
 a head configured to read information from a disk;
 an actuator configured to move the head in a transverse direction of tracks of the disk;
 a digital control module configured to perform position control including disturbance adaptive control with a predetermined sampling period using a control constant, in accordance with a position error between a target position and a current position of the object; and
 a table configured to store the control constant corresponding to a value of $\sin(\omega T)$ or $\cos(\omega T)$, with $\omega$ representing an angular frequency of a disturbance, T representing the sampling period,
 wherein the digital control module is configured to determine a control value of the actuator in accordance with the position error, calculates the value of $\sin(\omega T)$ or $\cos(\omega T)$ according to an adaptive law from a signal based on the position error, reads the corresponding control constant from the table in accordance with the calculated value of $\sin(\omega T)$ or $\cos(\omega T)$, and updates the control constant, to perform the position control including the disturbance adaptive control.

11. The disk apparatus of claim 10, wherein the digital control module performs the position control including the disturbance adaptive control through observer control.

12. The disk apparatus of claim 11, wherein the digital control module calculates an error from a state variable of the observer, an estimated gain, and an estimated position error, and adds the estimated error to the value of $\sin(\omega T)$ or $\cos(\omega T)$, to update the value of $\sin(\omega T)$ or $\cos(\omega T)$.

13. The disk apparatus of claim 12, wherein the digital control module determines the value of $\sin(\omega T)$ according to the following equations (29) and (30), or determines the value of $\cos(\omega T)$ according to the following equations (31) and (32):

$$E[k] = \frac{L4 \cdot z2[k+1] - L5 \cdot z1[k+1]}{z1[k+1]^2 + z2[k+1]^2} e[k] \quad (29)$$

$$\sin(\omega[k+1]T) = \sin(\omega[k]T) + K \cdot E[k] \quad (30)$$

$$E[k] = -\frac{L4 \cdot z1[k+1] + L5 \cdot z2[k+1]}{z1[k+1]^2 + z2[k+1]^2} e[k] \quad (31)$$

$$\cos(\omega[k+1]T) = \cos(\omega[k]T) + K \cdot E[k] \quad (32)$$

14. The disk apparatus of claim 11, wherein the digital control module calculates an error from a state variable of a current sample of the observer and a state variable of a next sample, to update the value of $\sin(\omega T)$ or $\cos(\omega T)$.

15. The disk apparatus of claim 14, wherein the digital control module determines the value of $\sin(\omega T)$ according to the following equations (33) through (35), or determines the value of $\cos(\omega T)$ according to the following equations (36) through (38):

$$G[k] = \frac{z1[k]z2[k+1] - z2[k]z1[k+1]}{z1[k+1]^2 + z2[k+1]^2} \quad (33)$$

$$E[k] = G[k] - \sin(\omega[k]T) \quad (34)$$

$$\sin(\omega[k+1]T) = \sin(\omega[k]T) + K \cdot E[k] \quad (35)$$

$$G[k] = \frac{z1[k]z1[k+1] + z2[k]z2[k+1]}{z1[k+1]^2 + z2[k+1]^2} \quad (36)$$

-continued $$E[k] = G[k] - \cos(\omega[k]T) \quad (37)$$

$$\cos(\omega[k+1]T) = \cos(\omega[k]T) + K \cdot E[k] \quad (38)$$

16. The disk apparatus of claim 11, wherein
the table stores a state estimating gain of the observer corresponding to the estimated value of $\sin(\omega T)$ or $\cos(\omega T)$, and
the digital control module updates a state estimating gain of the observer as the control constant with the use of a state estimating gain read from the table.

17. The disk apparatus of claim 10, wherein the digital control module performs clipping, so as to restrict the calculated value of $\sin(\omega T)$ or $\cos(\omega T)$ within a predetermined range.

18. The disk apparatus of claim 10, wherein
the digital control module includes:
a control module configured to calculate the control value of the actuator in accordance with the position error; and
a disturbance adaptive control module configured to calculate the value of $\sin(\omega T)$ or $\cos(\omega T)$ according to the adaptive law, and calculate a disturbance adaptive control value with the use of the control constant that is read from the table in accordance with the calculated value of $\sin(\omega T)$ or $\cos(\omega T)$, and
the actuator is driven with the control value of the control module and the disturbance adaptive control value.

\* \* \* \* \*